United States Patent
Asami et al.

(10) Patent No.: US 10,317,832 B2
(45) Date of Patent: Jun. 11, 2019

(54) IMAGE FORMING APPARATUS TO SUPPRESS TONER ADHERING TO GUIDING MEMBERS

(71) Applicant: CANON KABUSHIKI KAISHA, Tokyo (JP)

(72) Inventors: Jun Asami, Susono (JP); Toshiya Kaino, Suntou-gun (JP); Ryuichi Umehara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/896,997

(22) Filed: Feb. 14, 2018

(65) Prior Publication Data

US 2018/0239288 A1    Aug. 23, 2018

(30) Foreign Application Priority Data

Feb. 20, 2017   (JP) .................. 2017-029505

(51) Int. Cl.
| | |
|---|---|
| G03G 15/16 | (2006.01) |
| G03G 15/00 | (2006.01) |
| G03G 15/20 | (2006.01) |
| G03G 15/02 | (2006.01) |
| G03G 15/04 | (2006.01) |
| G03G 21/06 | (2006.01) |

(52) U.S. Cl.
CPC ..... *G03G 15/5054* (2013.01); *G03G 15/0225* (2013.01); *G03G 15/04045* (2013.01); *G03G 15/1695* (2013.01); *G03G 15/2021* (2013.01); *G03G 15/5041* (2013.01); *G03G 15/6558* (2013.01); *G03G 15/6585* (2013.01); *G03G 21/06* (2013.01); *H04N 2201/0081* (2013.01)

(58) Field of Classification Search
CPC ......... G03G 15/04045; G03G 15/0225; G03G 15/2021; G03G 15/5041; G03G 15/5054; G03G 15/6585; G03G 21/06; G03G 15/1695; G03G 15/6558; H04N 2201/0081

See application file for complete search history.

(56) References Cited

FOREIGN PATENT DOCUMENTS

| | | |
|---|---|---|
| JP | 3-211753 A | 8/1996 |
| JP | 10-123849 A | 5/1998 |
| JP | 10-221973 A | 8/1998 |
| JP | 2007-264342 A | 10/2007 |

*Primary Examiner* — Hoang X Ngo
(74) *Attorney, Agent, or Firm* — Canon U.S.A., Inc. IP Division

(57) ABSTRACT

A moving member is disposed between an upper guide, which guides a conveyed transfer material and to which a voltage is applied from a power source, and a lower guide, which guides the conveyed transfer material, the upper guide being disposed on an upstream side with respect to a photosensitive drum in a conveyance direction of the transfer material. The moving member is supported by the upper guide, and is capable of abutting against and separating from the lower guide. By being pushed by the transfer material, the moving member transitions from a first state in which the moving member is abutted against the lower guide to a second state in which the moving member is separated from the lower guide.

11 Claims, 18 Drawing Sheets

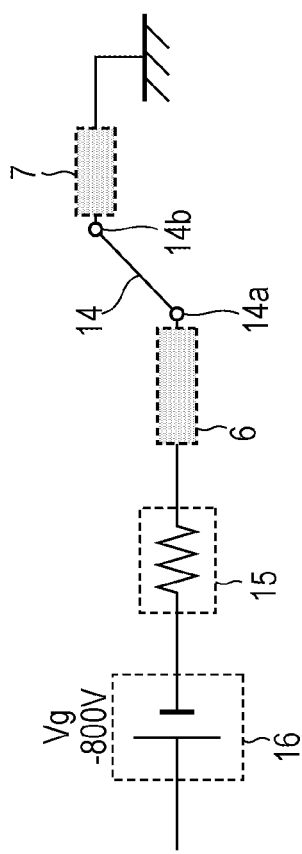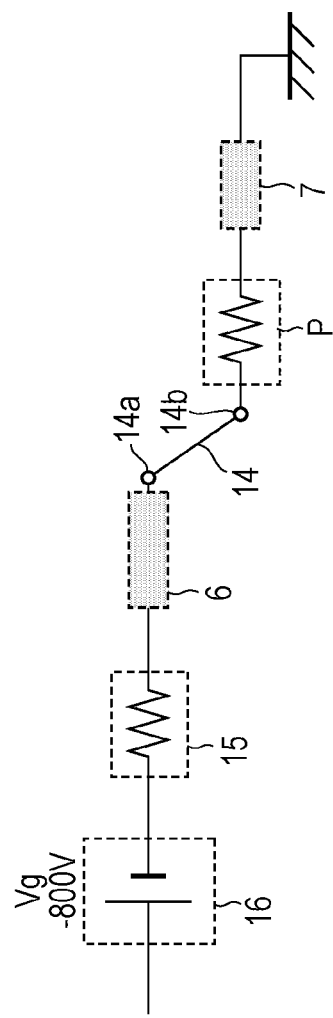

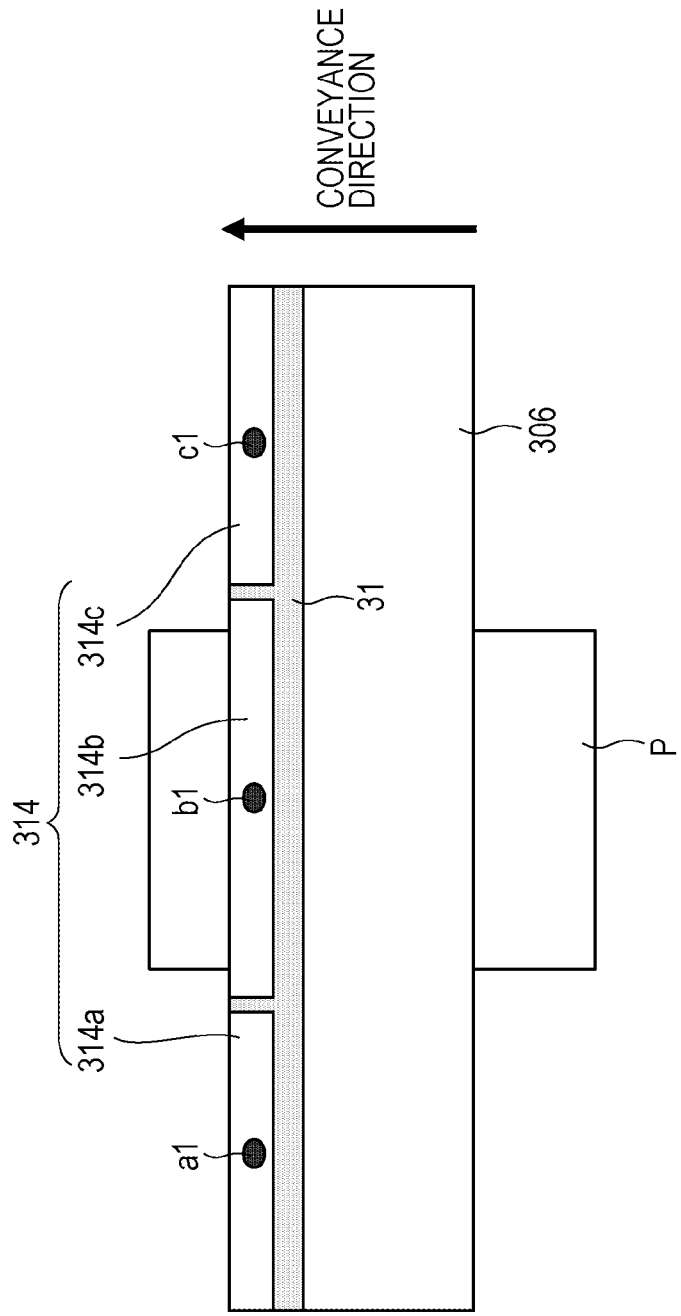

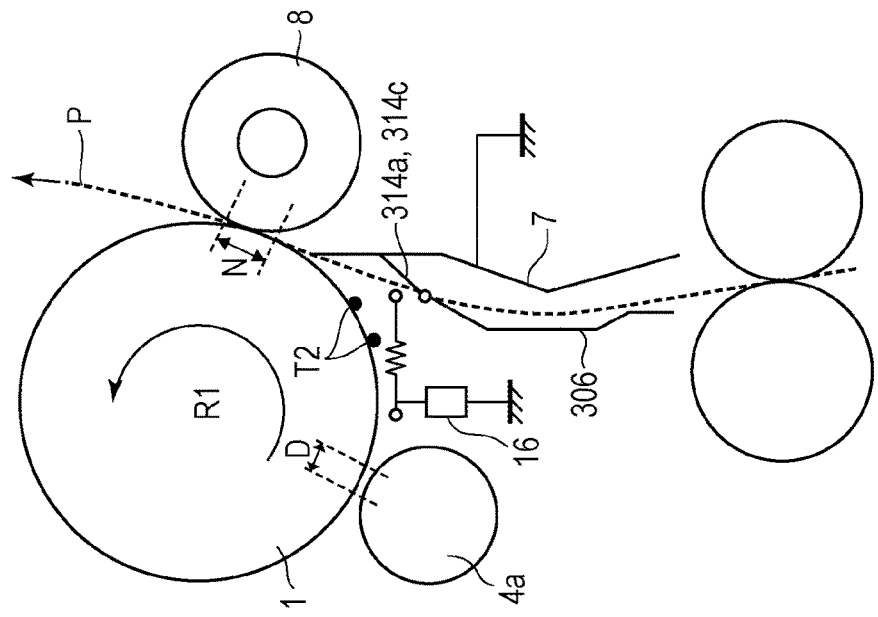
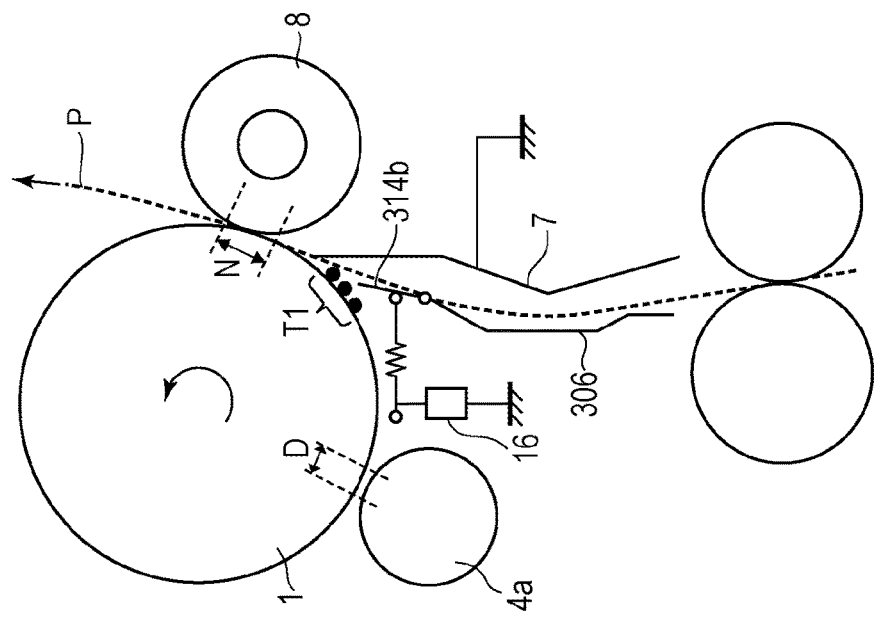

IMAGE FORMING APPARATUS TO SUPPRESS TONER ADHERING TO GUIDING MEMBERS

BACKGROUND OF THE INVENTION

Field of the Invention

The present disclosure relates to an image forming apparatus, such as a copier, a printer, and a facsimile, employing an electrophotographic method.

Description of the Related Art

A conventional image forming apparatus that employs an electrophotographic method forms an image on a transfer material, such as a sheet of paper or an OHP sheet, by performing a charging step, an exposing step, a developing step, a transferring step, and a fixing step. In the transferring step, toner image is transferred to the transfer material from the photosensitive drum by applying a voltage to the transfer member at a transfer portion where a photosensitive drum serving as an image bearing member and the transfer member abut against each other. In such an image forming apparatus, a configuration is widely known that, in order to obtain a high transferability when the toner image is transferred to the transfer material from the photosensitive drum, includes guiding members provided downstream of the conveying member that conveys the transfer material, in which the guiding members guide both surfaces of the transfer material to guide the transfer material to the transfer portion.

However, since the guiding members are provided near the transfer portion, there are cases in which the toner carried by the photosensitive drum adheres to the guiding member, and the transfer material conveyed to the transfer portion becomes tainted. Japanese Patent Laid-Open No. 2007-264342 discloses a configuration in which a voltage with the same polarity as the normal charge polarity of the toner (the normal charge polarity of the toner will be a negative polarity in the description hereinafter) is applied to the guiding member provided near the transfer portion.

With such a configuration, it is possible to suppress the toner that is charged with a negative polarity and that is carried by the photosensitive drum from adhering to the guiding member and to prevent the transfer material from becoming tainted.

However, in the configuration in Japanese Patent Laid-Open No. 2007-264342, while the toner charged with a negative polarity can be suppressed from adhering to the guiding member by applying a voltage with a negative polarity to the guiding member, there is a concern that the toner charged with a positive polarity may adhere to the guiding member.

There are cases in which toner that is charged with a positive polarity or toner that has become charged with a positive polarity by being rubbed against each other is included in the toner stored in the developing unit. Such toner charged with a positive polarity may adhere to the photosensitive drum from the developing unit due to the potential difference between the photosensitive drum and the developing member. For example, in a case in which the potential of the photosensitive drum is −1100 V and the potential applied to the developing member is −350 V, the toner charged with a positive polarity easily adheres to the photosensitive drum at positions where the absolute value of the potential of the photosensitive drum is larger than the absolute value of the developing potential. In other words, the toner charged with a positive polarity has a tendency to adhere to the photosensitive drum at timings such as pre-rotation, post-rotation, and time between sheets.

SUMMARY OF THE INVENTION

The present disclosure provides an image forming apparatus that suppresses toner from adhering to members that guide the conveyed transfer material.

An image forming apparatus according to the disclosure includes an image bearing member configured to carry a toner image, a transfer member configured to transfer the toner image carried on the image bearing member to a transfer material, a first guiding member disposed, in a conveyance direction of the transfer material, upstream with respect to a position where the toner image is transferred to the transfer material from the image bearing member, the first guiding member guiding the transfer material that is being conveyed, a second guiding member that is disposed so as to oppose the first guiding member and that guides the transfer material that is being conveyed, the second guiding member being electrically connected to an electrical ground, a power source connected to the first guiding member, the power source applying a voltage equivalent to a normal charge polarity of toner to the first guiding member during a transfer of the toner image to the transfer material from the image bearing member, and a moving member, the moving member being conductive and capable of moving between a first state in which the moving member is supported by either one of the first guiding member and the second guiding member and in which the moving member abuts against the first guiding member or the second guiding member not supporting the moving member, and a second state in which the moving member is separated from the first guiding member or the second guiding member not supporting the moving member by being pushed by the transfer material conveyed in the first state.

Further features of the present disclosure will become apparent from the following description of exemplary embodiments with reference to the attached drawings.

BRIEF DESCRIPTION OF THE DRAWINGS

FIGS. 3A and 3B are diagrams schematically illustrating conductive paths of a moving member according to the first exemplary embodiment.

FIG. 14 is a top view schematically illustrating a configuration of an upper guide and moving members according to a third exemplary embodiment.

FIGS. 15A and 15B are diagrams schematically illustrating states of the moving members that have been pushed by a small-sized transfer material, in the third exemplary embodiment.

DESCRIPTION OF THE EMBODIMENTS

Figure 1:
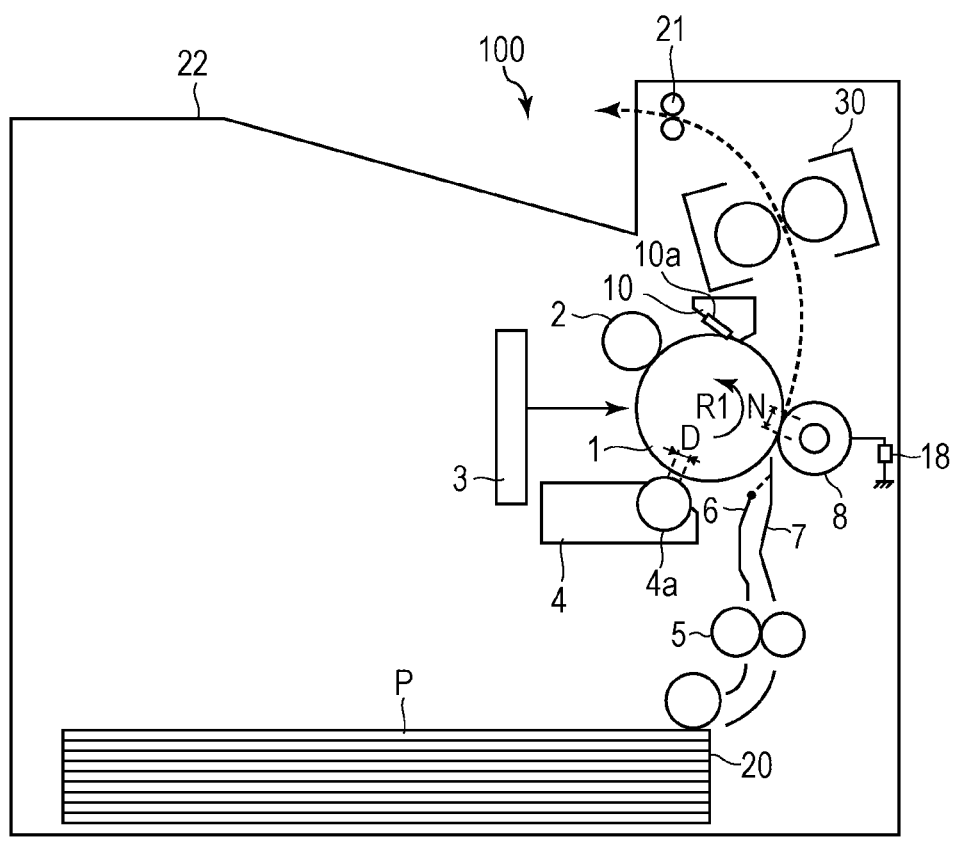
FIG. 1 is a cross-sectional view schematically illustrating a configuration of an image forming apparatus according to a first exemplary embodiment.

Hereinafter, referring to the drawings, modes for carrying out the disclosure will be exemplified in detail. Note that the dimensions, the materials, and the shapes of the components, the relative configuration of the components, and the like that are described in the following exemplary embodiments are to be appropriately altered based on the configuration of the device to which the present disclosure is applied and on various conditions, and the scope of the present disclosure is not intended to be limited by the following exemplary embodiments.

First Exemplary Embodiment

FIG. 1 is a cross-sectional view schematically illustrating a configuration of an image forming apparatus 100 according to the present exemplary embodiment. As illustrated in FIG. 1, the image forming apparatus 100 of the present exemplary embodiment includes a photosensitive drum 1 (an image bearing member) serving as a drum-shaped photosensitive member. The photosensitive drum 1 receiving driving force from a drive source (not shown) is rotationally driven in an R1-direction illustrated by an arrow at a predetermined circumferential velocity. Furthermore, a charge roller 2 serving as a charging member, an exposure unit 3, a developing unit 4 including a developing roller 4a serving as a developing member, and a cleaning unit 10 including a cleaning blade 10a are disposed around the photosensitive drum 1.

The charge roller 2 abuts against the photosensitive drum 1 and is capable of uniformly charging the photosensitive drum 1 by having a voltage applied thereto from a charging-power source (not shown). Toner is stored in the developing unit 4, and the developing roller 4a is capable of carrying the toner stored in the developing unit 4.

Note that owing to spacers (not shown) provided at the two ends in a longitudinal direction of the developing roller 4a, the developing roller 4a is disposed in a state in which a void is formed in an area in a developing portion D where the photosensitive drum 1 and the developing roller 4a oppose each other. In other words, a so-called jumping development method is used in the configuration of the present exemplary embodiment in which the developing roller 4a does not abut against the photosensitive drum 1, and the toner carried by the developing roller 4a using force of an electric field generated in the void in the developing portion D is developed on the photosensitive drum 1.

Furthermore, a transfer roller 8 serving as a transfer member that abuts against the photosensitive drum 1 to form a transfer portion N is disposed in a position that opposes the photosensitive drum 1. The transfer roller 8 includes a metal core, and an elastic member formed of conductive rubber, for example, formed around the surface of the metal core, and is connected to a transferring-power source 18. The transfer roller 8 according to the present exemplary embodiment is a conductive sponge roller formed of nitrile rubber (NBR) or hydrin rubber. A conductive sponge roller adjusted to have an electrical resistance of about $10^8 \Omega$ in a normal-temperature and normal-humidity environment is used.

An upper guide 6 (a first guiding member) that guides a transfer material P, and a lower guide 7 (a second guiding member) disposed so as to oppose the upper guide 6 are provided upstream of the transfer portion N in a conveyance direction of the transfer material P. A conveyance roller 5 serving as a conveying member that conveys the transfer material P while correcting a skew of the transfer material P, and a sheet feeding cassette 20 that stores the transfer materials P, such as sheets of paper and OHP sheets, are provided further upstream of the upper guide 6 and the lower guide 7.

A fixing unit 30 is provided downstream of the transfer portion N in the conveyance direction of the transfer material P. Moreover, a sheet discharge tray 22 on which a transfer material P, on which an image has been formed and which has been discharged from the image forming apparatus 100, is stacked, and a discharge roller 21 that discharges the transfer material P on the sheet discharge tray 22 are provided downstream of the fixing unit 30.

The photosensitive drum 1 is rotationally driven when an image forming operation is started by the controller circuit (not shown) that has received an image signal, and in the course of the rotation, the photosensitive drum 1 is uniformly charged to a predetermined potential by the charge roller 2 to which a voltage having a predetermined polarity (a negative polarity in the present exemplary embodiment) has been applied. Subsequently, an electrostatic latent image corresponding to an image of an object is formed on a surface of the photosensitive drum 1 by exposure according to an image signal with the exposure unit 3. The electrostatic latent image is developed at the developing position with the developing roller 4a carrying toner, and is visualized on the photosensitive drum 1 as a toner image. In the present exemplary embodiment, a normal charge polarity of the toner stored in the developing unit 4 is a negative polarity, and the electrostatic latent image is developed in a reversed manner with toner charged by the charge roller 2 to have the same charge polarity with that of the photosensitive drum 1. However, not limited to the above, the present disclosure can be applied to an image forming apparatus that performs positive development of the electrostatic latent image with toner that has been charged to a polarity opposite to the charge polarity of the photosensitive drum 1.

By applying, a voltage having an opposite polarity (a positive polarity in the present exemplary embodiment) with respect to the normal charge polarity of the toner photosensitive drum 1 to the transfer roller 8 from the transferring-power source 18, the toner image is, at the transfer portion N, transferred to the transfer material P fed from the sheet feeding cassette 20. In the above state, the transfer material P passing the upper guide 6 and the lower guide 7 is nipped at the transfer portion N, while the timing at which the transfer material P conveyed to the transfer portion N is adjusted and the skew thereof is corrected by the conveyance roller 5. Note that the transfer roller 8 is urged towards the photosensitive drum 1 with an urging unit (not shown), and when a toner image is transferred to the transfer material P from the photosensitive drum 1, the transfer roller 8 following the rotation of the photosensitive drum 1 is rotated.

The transfer material P on which the toner image has been transferred from the photosensitive drum 1 at the transfer portion N is conveyed to the fixing unit 30 through a path depicted by a broken line arrow in the figure, and the toner image is fixed by heating and compressing the transfer material P in the fixing unit 30. Subsequently, the transfer material P to which the toner image has been fixed is discharged from the image forming apparatus 100 with the discharge roller 21, and is stacked on the sheet discharge tray 22. Note that residual toner on the photosensitive drum 1 after the toner image has been transferred to the transfer material P from the photosensitive drum 1 is collected in the cleaning unit 10 with the cleaning blade 10a disposed downstream of the transfer portion N in the rotation direction of the photosensitive drum 1. An image is formed on the transfer material P with the above operation in the image forming apparatus 100 of the present exemplary embodiment.

Figure 2:
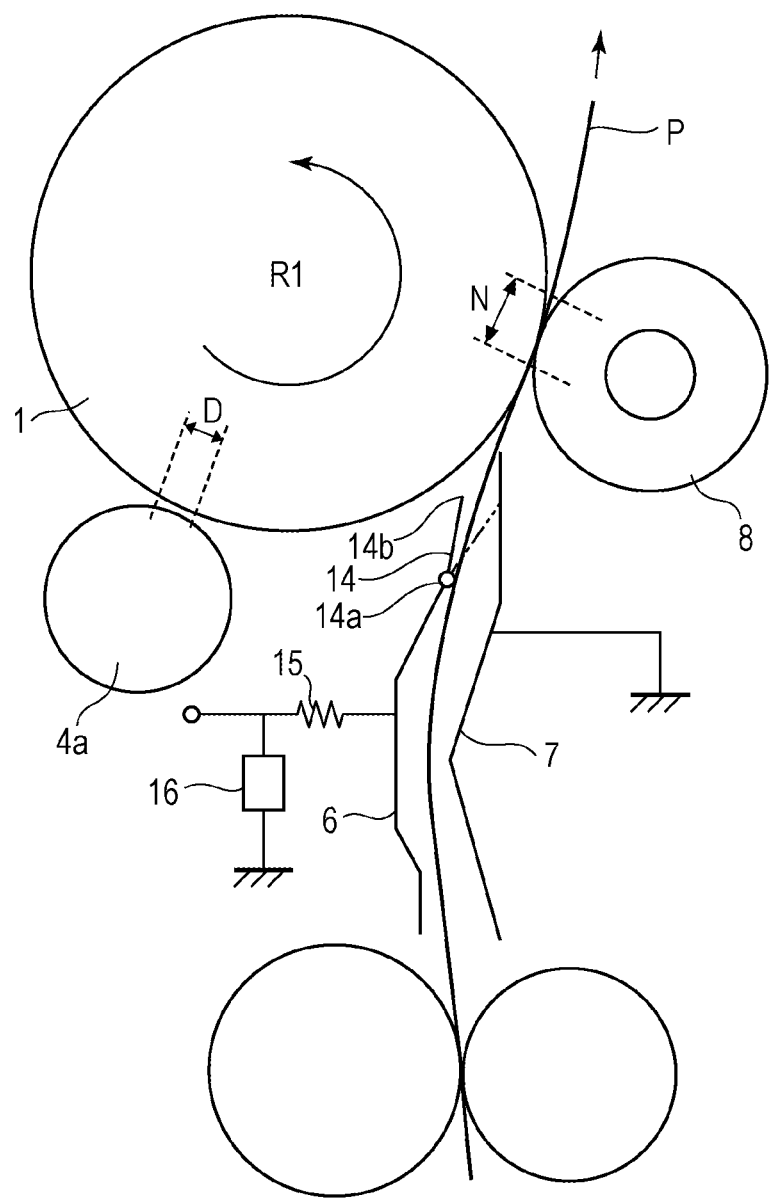
FIG. 2 is a cross-sectional view schematically illustrating a configuration near a transport portion according to the first exemplary embodiment.

FIG. 2 is a cross-sectional view schematically illustrating a configuration around the transfer portion N of the image forming apparatus 100 according to the present exemplary embodiment. As illustrated in FIG. 2, the upper guide 6 and the lower guide 7 are guiding members that guide the transfer material P, which is fed from the sheet feeding cassette 20, to the transfer portion N, and are both formed of a conductive material, such as stainless steel (SUS). Note that regarding the transfer material P at the transfer portion N on which a toner image is transferred from the photosensitive drum 1, the upper guide 6 is disposed so as to oppose the surface of transfer material P in contact with the photosensitive drum 1, and the lower guide 7 is disposed so as to oppose the surface of the transfer material P in contact with the transfer roller 8. The upper guide 6 and the lower guide 7 have substantially the same longitudinal width to that of the photosensitive drum 1 in the longitudinal direction of the photosensitive drum 1, and the upper guide 6 and the lower guide 7 are disposed so that the longitudinal directions thereof are orthogonal to the conveyance direction of the transfer material P.

A moving member 14 is provided downstream of the upper guide 6 in the conveyance direction of the transfer material P so as to extend to the upper guide 6. The moving member 14 includes a supported portion 14a supported by the upper guide 6, and a contact portion 14b capable of being abutted against or separated from the lower guide 7, and is disposed so that the contact portion 14b is movable about the supported portion 14a serving as a fulcrum. A sheet-shaped member formed of a conductive material, such as an SUS or a resin that is about a few hundred micrometers thick, so as not to be in the way of the conveyed transfer material P is used as the moving member 14. In the present exemplary embodiment, the moving member 14 is disposed in the entire area in the longitudinal direction of the upper guide 6.

Note that as illustrated by a broken line and a solid line in FIG. 2, the moving member 14 according to the present exemplary embodiment is a moving member in which the contact portion 14b can be moved depending on the presence or absence of the transfer material P. More specifically, in a case in which the moving member 14 is not pushed by the transfer material P conveyed towards the transfer portion N, as illustrated by the broken line in FIG. 2, the moving member 14 is in a first state in which the contact portion 14b abuts against the lower guide 7. In the above state, the moving member 14 is in contact with both the upper guide 6 and the lower guide 7, and the upper guide 6 is electrically connected to the lower guide 7 through the moving member 14.

On the other hand, in a case in which the moving member 14 is pushed by the transfer material P conveyed towards the transfer portion N, as illustrated in FIG. 2, the moving member 14 is in a second state in which the contact portion 14b is separated from the lower guide 7. In the above state, since the moving member 14 is in contact with the transfer material P, and the transfer material P is in contact with the lower guide 7, the upper guide 6 is electrically connected to the lower guide 7 through the moving member 14 and the transfer material P.

At least while the toner image is transferred to the transfer material P from the photosensitive drum 1 at the transfer portion N, the power source 16 applies a voltage Vg that has the same polarity (a negative polarity in the present exemplary embodiment) as the normal charge polarity of the toner to the upper guide 6. Since the moving member 14 disposed so as to extend to the upper guide 6 is disposed at a position near the photosensitive drum 1, toner charged with a negative polarity due to the potential difference between the photosensitive drum 1 and the moving member 14 easily adheres to the moving member 14 when the toner image is transferred to the transfer material P from the photosensitive drum 1. In the configuration of the present exemplary embodiment, a potential that suppresses the toner with a negative polarity from adhering to the upper guide 6 and the moving member 14 is formed by applying a voltage with a negative polarity from the power source 16 while the toner image is transferred to the transfer material P from the photosensitive drum 1.

The potential of the moving member 14 is determined by a voltage dividing resistance ratio of a conduction path from the power source 16 to where the conduction path is grounded, the conduction path being formed by the power source 16, a resistor 15, the moving member 14, the transfer material P, and the lower guide 7, which is connected to an electrical ground, in the above order. Note that since the power source 16 in the present exemplary embodiment is commonly used as a high-voltage power source that applies a voltage to the fixing unit 30 to prevent the fixing unit 30 from becoming statically charged, when the image forming operation is started, the voltage Vg with a fixed value is output from the power source 16 at all times without any changes in the polarity and the output value of the voltage. Note that the voltage Vg is −800 [V], and the resistor 15 having an electrical resistance of 200 MΩ is used. Furthermore, a surface resistivity of each of the upper guide 6 and the lower guide 7 is $10^5$ Ω or smaller, and a volume resistivity thereof is $10^8$ Ω·cm or smaller.

FIG. 3A is a diagram schematically illustrating the conduction path from the power source 16 to the lower guide 7 connected to the electrical ground in the first state in which the contact portion 14b of the moving member 14 abuts against the lower guide 7. Furthermore, FIG. 3B a diagram schematically illustrating the conduction path from the power source 16 to the lower guide 7 connected to the electrical ground in the second state in which the contact portion 14b of the moving member 14 is separated from the lower guide 7.

As illustrated in FIG. 3A, in the first state, the upper guide 6 and the lower guide 7 become connected to each other through the moving member 14 by contacting the moving member 14 to both the upper guide 6 and the lower guide 7. In the above state, the transfer material P is not interposed between the upper guide 6 and the lower guide 7, and when the voltage Vg of −800 [V] is output from the power source 16, a potential Vs of the upper guide 6 is almost 0 [V].

On the other hand, as illustrated in FIG. 3B, in the second state, the upper guide 6 is electrically conducted to the lower guide 7 through the moving member 14 and the transfer material P. In the above, when the voltage Vg of −800 [V] is output from the power source 16, the potential Vs of the upper guide 6 is −400 [V] due to the voltage dividing resistance ratio that has taken into account the electrical resistance of the transfer material P (it is assumed that the used transfer material P is about 200 MΩ under a normal-temperature and normal-humidity environment).

In other words, in the configuration of the present exemplary embodiment, the potential of the upper guide 6 differs depending on whether the transfer material P is interposed between the upper guide 6 and the lower guide 7. With the above configuration, toner, which is adhered to the photosensitive drum 1 from the developing unit 4 and which is charged with a polarity (a positive polarity in the present exemplary embodiment) opposite to the normal charge polarity of the toner), can be suppressed from adhering onto the upper guide 6. Hereinafter, effects of the present exemplary embodiment will be described in detail.

Figure 4:
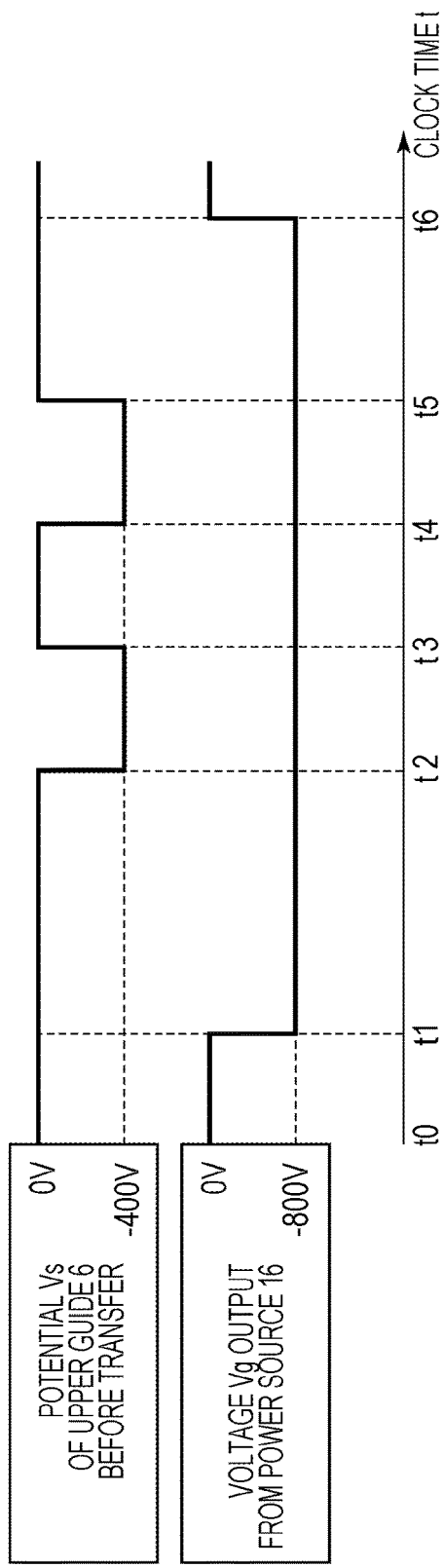
FIG. 4 is a diagram according to the first exemplary embodiment schematically illustrating a secular change of a potential of an upper guide when an image is formed on a transfer material.

FIG. 4 is a diagram schematically illustrating a secular change of the potential of the upper guide 6 in a case in which images are continuously formed on two transfer materials P under a normal-temperature and normal-humidity environment (room temperature at 25° C., humidity at 50%). Note that the electrical resistance of the each of the two continuously fed transfer materials P in a thickness direction is about 200 MΩ. Furthermore, clock time t0 is the clock time at which the image forming operation is started in the image forming apparatus 100.

As illustrated in FIG. 4, the image forming operation is started at clock time t0, and the voltage Vg of −800 [V] is output from the power source 16 after an elapse of a predetermined time period at clock time t1. During the above period, since the moving member 14 is in contact with both the upper guide 6 and the lower guide 7, the potential Vs of the upper guide 6 is almost 0 [V].

Clock time t2 is a clock time at which the first transfer material P conveyed towards the transfer portion N is interposed between the upper guide 6 and the lower guide 7, and at which the contact portion 14b of the moving member 14 is separated from the lower guide 7. During the above time, the moving member 14 being pushed by the conveyed first transfer material P is separated from the lower guide 7, and the upper guide 6 is electrically connected to the lower guide 7 through the moving member 14 and the first transfer material P. Accordingly, affected by the electrical resistance of the first transfer material P, the potential Vs of the upper guide 6 becomes −400 [V].

Clock time t3 is a clock time at which a trailing edge of the first transfer material P passes the contact portion 14b of the moving member 14 in the conveyance direction of the transfer material P, and at which the contact portion 14b comes into contact with the lower guide 7 again. During the above time, the upper guide 6 is electrically connected to the lower guide 7 through the moving member 14, and the potential Vs is almost 0 [V].

Clock time t4 is a clock time at which a second transfer material P, which is a sheet succeeding the first transfer material P, is interposed between the upper guide 6 and the lower guide 7, and at which a leading edge of the second transfer material P pushes the moving member 14 and the contact portion 14b of the moving member 14 is separated from the lower guide 7. During the above time, similar to clock time t2, the potential Vs of the upper guide 6 is −400 [V].

Clock time t5 is a clock time at which a trailing edge of the second transfer material P passes the contact portion 14b of the moving member 14 in the conveyance direction of the transfer material P, and at which the contact portion 14b comes into contact with the lower guide 7 again. During the above time, similar to clock time t3, the potential Vs of the upper guide 6 is almost 0 [V]. Subsequently, at clock time t6, when the formation of images on the two continuously fed transfer materials P is completed, the power source 16 stops outputting the voltage Vg.

Figure 5:
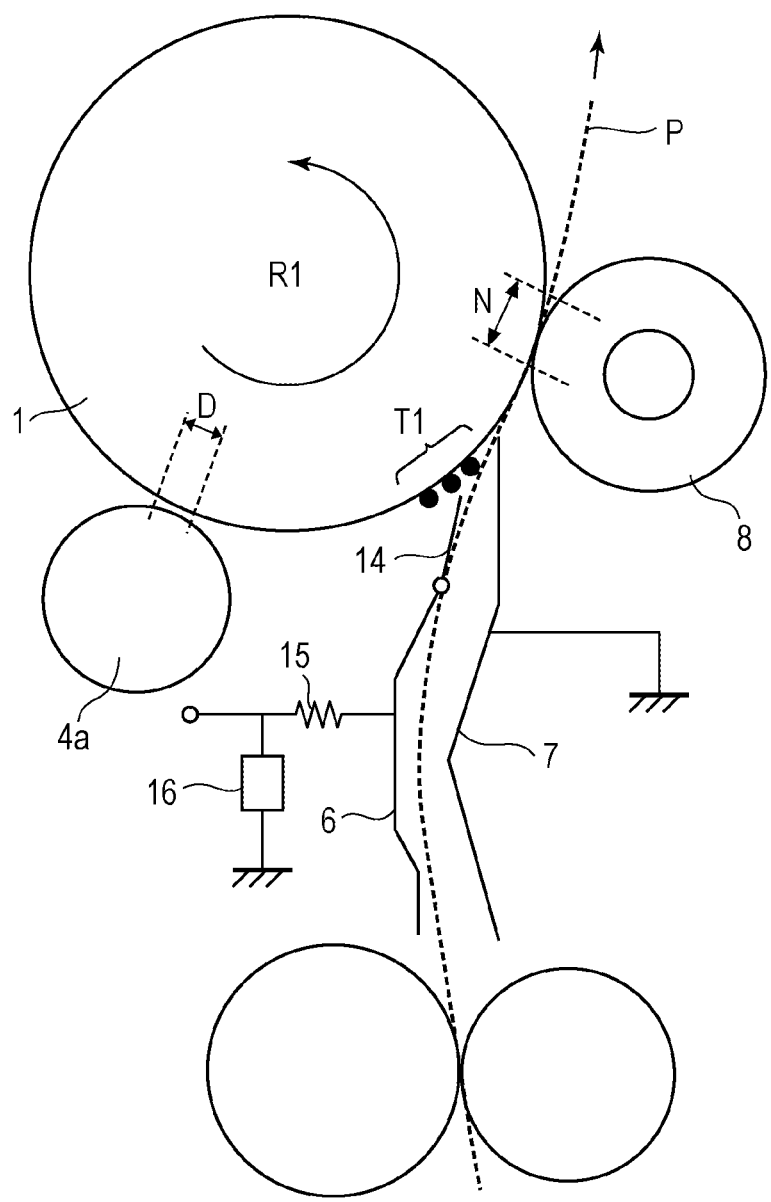
FIG. 5 is a diagram schematically illustrating a second state in which the moving member has been separated from the lower guide in the first exemplary embodiment.

FIG. 5 is a diagram schematically illustrating the second state in the present exemplary embodiment in which the moving member 14 is pushed by the transfer material P conveyed between the upper guide 6 and the lower guide 7, and in which the contact portion 14b is separated from the lower guide 7. In other words, FIG. 5 illustrates the states during clock times t2 to t3 in FIG. 4 and during clock times t4 to t5. During the above time, in order to transfer the toner image from the photosensitive drum 1 to the transfer material P at the transfer portion N, toner T1 charged with a negative polarity is developed on the photosensitive drum 1 from the developing roller 4a. As illustrated in FIG. 5, in a case in which the toner image is transferred from the photosensitive drum 1 to the transfer material P, the moving member 14 is pushed by the transfer material P conveyed towards the transfer portion N and, accordingly, the moving member 14 becomes most proximate to the photosensitive drum 1.

Accordingly, by setting the potential Vs of the upper guide 6 to −400 [V], the toner charged with a negative polarity can be suppressed from electrostatically adhering to the moving member 14 and the upper guide 6 from the photosensitive drum 1. With the above, the transfer material P can be prevented from becoming tainted by the toner adhered to the moving member 14. Note that in the present exemplary embodiment, when developing the toner image on the photosensitive drum 1 from the developing roller 4a, a potential of −350 [V] is formed on the developing roller 4a by forming a latent image electric potential of −150 [V] on the photosensitive drum 1 with the exposure unit 3, and by applying a voltage from a developing-power source (not shown).

Figure 6:
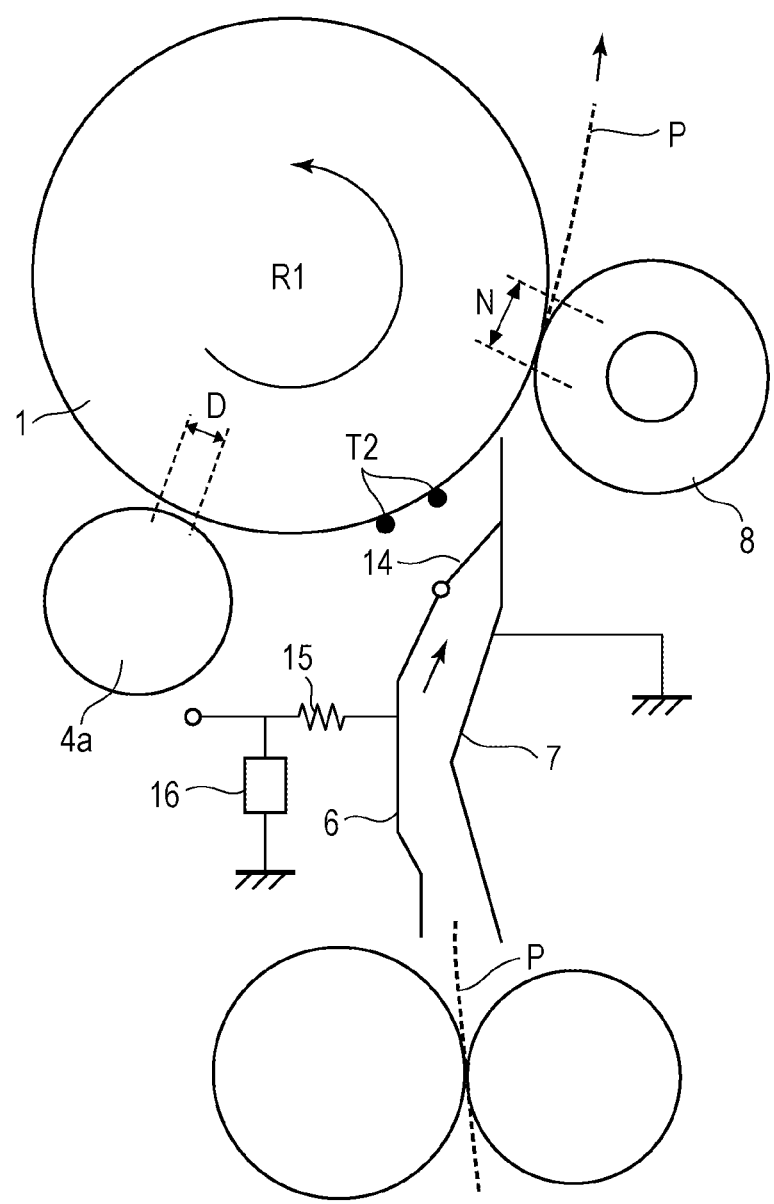
FIG. 6 is a diagram schematically illustrating a first state in which the moving member is abutted against the lower guide in the first exemplary embodiment.

FIG. 6 is a diagram schematically illustrating the first state in the present exemplary embodiment in which the moving member 14 is not pushed by the transfer material P conveyed between the upper guide 6 and the lower guide 7, and in which the contact portion 14b is abutted against the lower guide 7. In other words, FIG. 6 illustrates the states during clock times t0 to t2, t3 to t4, and t5 to t6 in FIG. 4. Note that clock times t0 to t2, and clock times t5 to t6 are clock times before the toner image ins transferred from the photosensitive drum 1 to the transfer material P, and clock times t3 to t4 are clock times corresponding to times between sheets of the transfer material P.

In the area of the photosensitive drum 1 before transfer and at the time between sheets, although the photosensitive drum 1 does not carry a toner image based on image information, a potential with negative polarity is uniformly formed on the photosensitive drum 1 being charged by the charge roller 2. Furthermore, there are cases in which toner that is pre-charged with a positive polarity or toner that has become charged with a positive polarity by being rubbed against each other (hereinafter, toner charged with a positive polarity is referred to as a polarity inverted toner) is included in the toner stored in the developing unit 4.

There are cases in which the polarity inverted toner adheres on the photosensitive drum 1 due to the potential difference between the potential of the developing roller 4a and the potential of the photosensitive drum 1. In particular, the polarity inverted toner easily becomes adhered to the photosensitive drum 1 that is uniformly charged by the charge roller 2 before transfer and at the time between sheets. The above happens because the absolute value of the potential of the photosensitive drum 1 charged by the charge roller 2 is larger than the absolute value of the potential formed on the developing roller 4a. Note that in the present exemplary embodiment, a uniform background potential of −1100 [V] is formed on the photosensitive drum 1 with the charge roller 2.

As illustrated in FIG. 6, in a case in which polarity inverted toner T2 adheres on the photosensitive drum 1 from the developing unit 4 due to the potential difference between the photosensitive drum 1 and the developing roller 4a, in the present exemplary embodiment, the upper guide 6 is electrically connected to the lower guide 7 through the moving member 14. In other words, since the potentials of the upper guide 6 and the moving member 14 to which the voltage Vg having a negative polarity is applied are almost 0 [V], adhesion of the polarity inverted toner charged with a positive polarity to the upper guide 6 and the moving member 14 can be suppressed. With the above, the transfer material P can be prevented from becoming tainted due to the adhesion of the toner to the moving member 14.

Table 1 illustrates, in a case in which high printing rate images are formed on a thousand sheets of continuously fed transfer materials P in the present exemplary embodiment and in a comparative example, various potential values, and evaluation results of the taint on the moving member 14 and on the upper guide 6 caused by adhesion of the toner and evaluation results of image defects owing to the tainted upper guide 6. Note that an image defect indicates that a portion in the leading edge or an image forming surface of the transfer material P conveyed towards the transfer portion N is tainted by coming in contact with the toner adhered to the moving member 14 and the upper guide 6.

Figure 7:
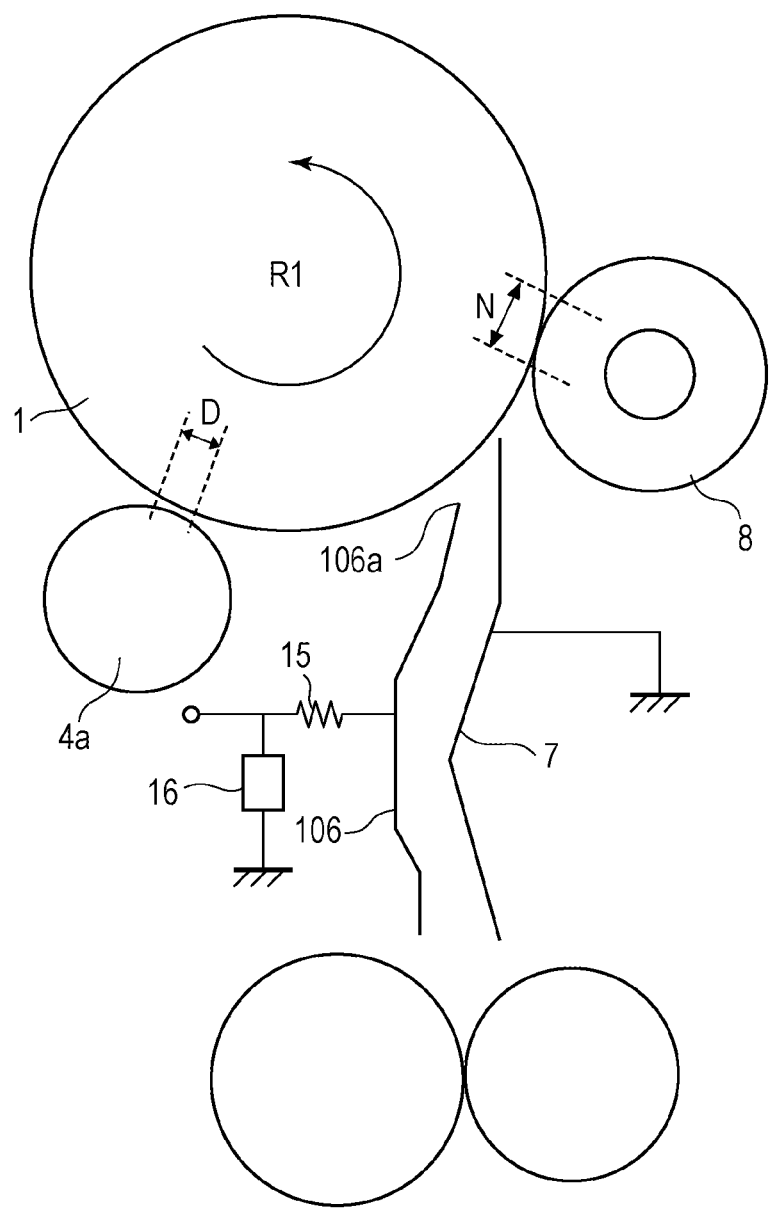
FIG. 7 is a diagram schematically illustrating a configuration of a comparative example of the first exemplary embodiment.

FIG. 7 is a diagram schematically illustrating a configuration of a comparative example. As illustrated in FIG. 7, in the comparative example, the moving member 14 of the present exemplary embodiment was not provided in an upper guide 106. Note that other than not providing the moving member 14 in the upper guide 106, the configuration of the comparative example was substantially the same as the configuration of the present exemplary embodiment. Description will be given while members that are the same as those of the present exemplary embodiment will be denoted with similar reference numerals as those of the present exemplary embodiment.

Regarding the criteria of the evaluation, "Excellent" was given to a case in which the taint on the upper guide was very insignificant and no image defect had occurred, "Good" was given to a case in which the taint on the upper guide was insignificant and no image defect had occurred. Furthermore, "Poor" was given to a case in which the taint on the upper guide was prominent, and "Very poor" was given to a case in which the taint on the upper guide is prominent and a noticeable image defect had occurred. Note that the environment under which the evaluation had been conducted was a normal-temperature and normal-humidity environment in which the room temperature was 25° C. and humidity was 50%. A letter-sized transfer material P having an electrical resistance of about 200 MΩ in the thickness direction was used as the transfer material P, and the voltages Vg output from the power source 16 were −800 [V] and −1200 [V].

TABLE 1

| | Voltage Vg [V] | Potentials of upper guides 6 and 106 | | Evaluation |
| --- | --- | --- | --- | --- |
| | | During transfer | Time between sheets | |
| Exemplary Embodiment | −800 | −400 | 0 | Good |
| | −1200 | −600 | 0 | Excellent |
| Comparative Example | −800 | −400 | −800 | Poor |
| | −1200 | −600 | −1200 | Very poor |

As illustrated in Table 1, in the configuration of the present exemplary embodiment, the taint of the upper guide 6 was insignificant and no image defect occurred regardless of the value of the voltage Vg output from the power source 16. Conversely, in the configuration of the comparative example, taint of the upper guide 106 was prominent, and an image defect that was more noticeable occurred when the absolute value of the voltage Vg output from the power source 16 was increased. The above difference is due to the difference in the potential formed on the upper guide 6 according to the configuration of the present exemplary embodiment at the time between sheets, and the potential formed on the upper guide 106 according to the configuration of the comparative example at the time between sheets.

Figure 8A:
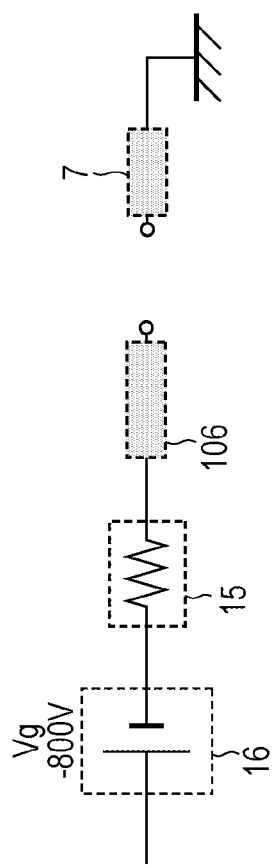
FIGS. 8A and 8B are diagrams schematically illustrating a relationship in conductivity between the upper guide and the lower guide according to the comparative example of the first exemplary embodiment.

FIG. 8A is a diagram schematically illustrating a conducive relationship between the upper guide 106 and the lower guide 7 at the time between sheets in the configuration of the comparative example. Furthermore, FIG. 8B a diagram schematically illustrating a conductive relationship between the upper guide 106 and the lower guide 7 when the toner image is transferred to the transfer material P from the photosensitive drum 1 in the configuration of the comparative example.

Figure 8B:
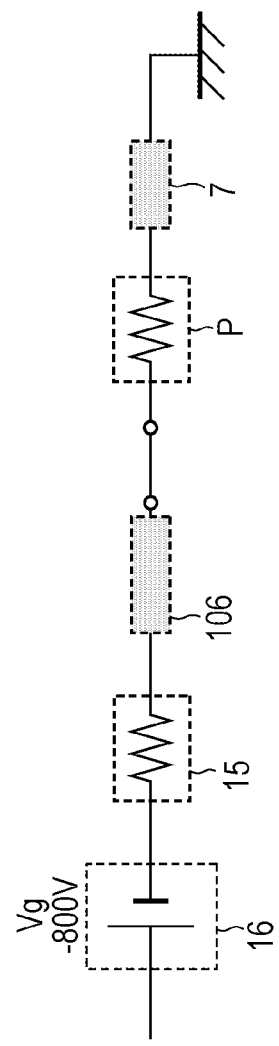

As illustrated in FIG. 8B, in a case in which the toner image is transferred to the transfer material P from the photosensitive drum 1, the upper guide 106 is electrically connected to the lower guide 7 through the transfer material P. Accordingly, as illustrated in Table 1, the potential formed on the upper guide 106 during a transfer of the toner image in the configuration of the comparative example was the same as the potential formed on the upper guide 6 during the transfer of the toner image in the configuration of the present exemplary embodiment.

On the other hand, since the configuration of the comparative example does not include the moving member 14, as illustrated in FIG. 8A, the upper guide 106 does not come into contact with the lower guide 7 at the time between sheets, and is in a floating state that is not electrically connected to an electrical ground. With the above, the potential of the upper guide 106 is the same in value as the voltage Vg output from the power source 16. In other words, as the absolute value of the voltage Vg output from the power source 16 becomes larger, the absolute value of the potential formed on the upper guide 106 at the time between sheets becomes larger; accordingly, the polarity inverted toner adhered on the photosensitive drum 1 adheres on the upper guide 106 more easily.

As described above, the polarity inverted toner with a positive potential adheres on the photosensitive drum 1 more easily at the time between sheets. Accordingly, it is desirable that the potential formed on the upper guide to suppress adhesion of toner is 0 [V] or has a positive polarity. Alternatively, if the potential has a negative polarity, it is desirable that the potential is small in absolute value. Conversely, in a case in which the toner image is transferred to the transfer material P from the photosensitive drum 1, a large amount of toner charged with a negative polarity is carried on the photosensitive drum 1. Accordingly, it is desirable that the potential formed on the upper guide to suppress adhesion of toner has a negative polarity and is larger in absolute value.

In the configuration of the comparative example, even when the toner image is transferred to the transfer material P from the photosensitive drum 1 and even at the time between sheets, a voltage having a negative polarity is formed on the upper guide 106 at all times with the voltage Vg output from the power source 16. With the above, while the toner with a negative polarity can be suppressed from adhering to the upper guide 106, the toner with a positive polarity adhered on the photosensitive drum 1 at the time between sheets cannot be suppressed from adhering to the upper guide 106. On the other hand, in the configuration of the present exemplary embodiment, the adhesion of the toner with a negative polarity can be suppressed by forming a potential with a negative polarity on the upper guide 6 and the moving member 14 during the transfer, and the adhesion of the toner with positive polarity can be suppressed by setting the potential of the upper guide 6 and the moving member 14 to almost 0 [V] at the time between sheets.

As described above, in the present exemplary embodiment, the moving member 14 is provided between the upper guide 6 and the lower guide 7, and adhesion of toner to the guiding member provided upstream of the transfer portion N in the conveyance direction of the transfer material P can be suppressed. With the above, the transfer material P can be prevented from becoming tainted by the toner adhered to the guiding member.

According to the configuration of the present exemplary embodiment, the potentials of the upper guide 6 and the moving member 14 can be switched by having the contact portion 14b of the moving member 14 abut against or separate from the lower guide 7. With the above, the polarity of the voltage applied to the upper guide 6 does not have to be switched to suppress adhesion of the toner charged to a negative polarity or a positive polarity; accordingly, a power source 16 that only outputs a voltage with a negative polarity can be used. Additionally, since the potential of the upper guide 6 becomes automatically switched according to whether the transfer material P is passed through or not, the voltage Vg output from the power source 16 does not have to be changed to change the potential of the upper guide 6, and it is only sufficient to output the voltage Vg, which is a predetermined voltage, at all times during the image formation. Furthermore, in the present exemplary embodiment, the contact portion 14b is separated from the lower guide 7 by having the transfer material P conveyed towards the transfer portion N push the moving member 14. In other words, since the contact portion 14b performs an operation of abutting against or separating from the lower guide 7 according to whether the transfer material P is passed or not, another mechanism for switching the contact portion 14b between abutment against and separation from the lower guide 7 does not have to be provided; accordingly, the configuration is simplified.

In the configuration of the present exemplary embodiment, since the polarity and the output value of the voltage Vg output from the power source 16 during formation of an image do not have to be switched, the power source that applies a voltage to the fixing unit 30 and the power source that applies a voltage to the upper guide 6 are used in a common manner. By commonly using a high-voltage power source in the above manner, space saving and cost reduction of the power supplying board can be achieved. Note that in the present exemplary embodiment, while the high-voltage power source of the fixing unit 30 and the power source 16 are used in a common manner, not limited to the above, another high-voltage power source that outputs a voltage with a negative polarity during image formation and the power source 16 can be used in a common manner.

In the configuration of the present exemplary embodiment, the supported portion 14a of the moving member 14 is supported by the upper guide 6, and the contact portion 14b abuts against or is separated from the lower guide 7. However, not limited to the above, the supported portion 14a of the moving member 14 may be supported by the lower guide 7, and the contact portion 14b may be configured to abut against or be separated from the upper guide 6. A similar effect can be obtained with the above. In other words, it is only sufficient that the supported portion 14a of the moving member 14 is supported by either one of the upper guide 6 and the lower guide 7, and the contact portion 14b of the moving member 14 abuts against or is separated from the other one of the upper guide 6 or the lower guide 7.

Furthermore, in the present exemplary embodiment, the lower guide 7 is grounded, and the potential of the upper guide 6 during the time between sheets is almost 0 [V]; however, not limited to the above, a resistor may be disposed between the lower guide 7 and the electrical ground. With the above, the electric current flowing from the transfer roller 8 towards the photosensitive drum 1 can be suppressed from leaking through the transfer material P that has as low electrical resistance when the toner image is transferred from the photosensitive drum 1 to the transfer material with a low electrical resistance. It is desirable to set the potential of the upper guide 6 and the moving member 14 to a positive polarity or to 0 [V] in order to suppress adhesion of the polarity inverted toner. Even when the potential has a negative polarity, if the absolute value of the potential is small to some extent, the adhesion of the polarity inverted toner can be suppressed.

Note that in the present exemplary embodiment, the moving member 14 is disposed in the entire area in the longitudinal direction of the upper guide 6. Note that regarding the moving member 14, a single continuous moving member 14 may be provided in the entire area in the longitudinal direction of the upper guide 6, or a plurality of moving members 14 may be disposed in the entire area in the longitudinal direction of the upper guide 6. In a case in which a plurality of moving members 14 are disposed, the plurality of moving members 14 may be disposed at equal intervals in the longitudinal direction of the upper guide 6 or disposed in an irregular manner, as long as switching between the first state and the second state can be performed by being pushed by the conveyed transfer material P.

Figure 9:
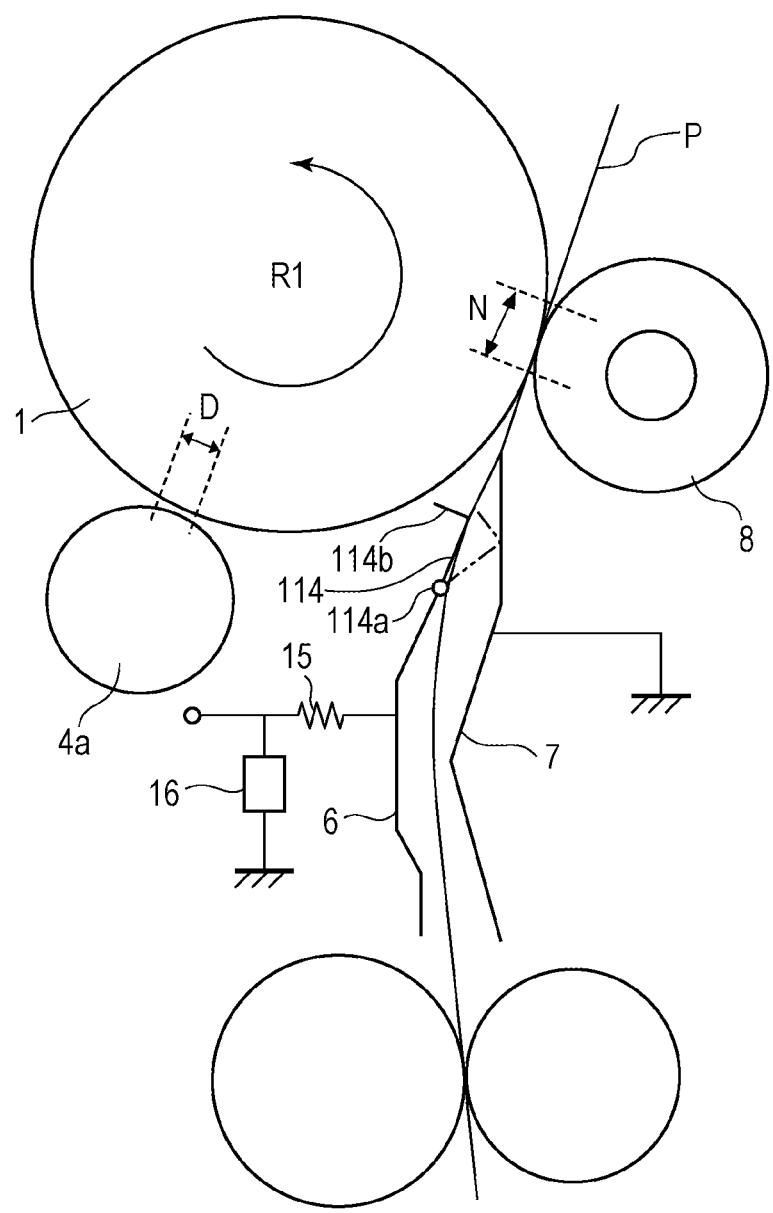
FIG. 9 is a diagram schematically illustrating a configuration of a modification example of the first exemplary embodiment.

FIG. 9 is a diagram schematically illustrating a configuration of a modification example of the present exemplary embodiment. In the present exemplary embodiment, the moving member 14 has been described in which the supported portion 14a is provided on a first end side, and in which the contact portion 14b is provided on a second end side; however, not limited to the above, as illustrated in FIG. 9, a contact portion 114b may be provided not at an end portion of a moving member 114. In the moving member 114 of the modification example, the contact portion 114b is provided between a first end portion and a second end portion, and a supported portion 114a is supported by the upper guide 6. Similar to the present exemplary embodiment, the modification example also includes a configuration in which the contact portion 114b is separated from the lower guide 7 by, when in the first state in which the contact portion 114b is abutted against the lower guide 7 (depicted by a broken line in FIG. 9), having the conveyed transfer material P push the moving member 114. Note that the second state in which the contact portion 114b is separated from the lower guide 7 is depicted by a solid line in FIG. 9.

Figure 10:
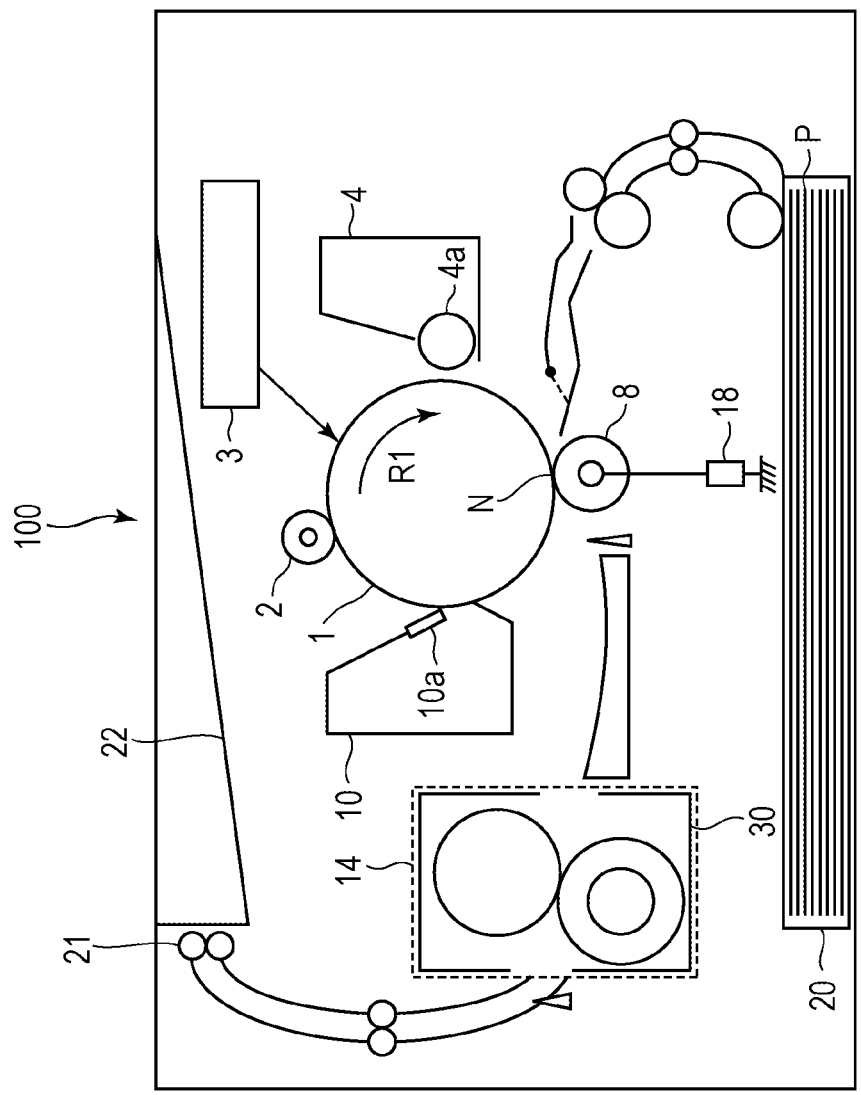
FIG. 10 is a cross-sectional view schematically illustrating a configuration of an image forming apparatus other than the image forming apparatus of the first exemplary embodiment.

FIG. 10 is a cross-sectional view schematically illustrating a configuration in which the present exemplary embodiment is applied to another image forming apparatus. As illustrated in FIG. 1, in the present exemplary embodiment, the configuration of the image forming apparatus has been described in which the conveyance path from where the transfer material P is fed from the sheet feeding cassette 20 to where the transfer material P is discharged is formed in a vertical direction. However, not limited to the above, a similar effect can be obtained in an image forming apparatus, illustrated in FIG. 10, configured so that the toner image is transferred to the transfer material P from the photosensitive drum 1 in a conveyance path formed in a horizontal direction.

Second Exemplary Embodiment

Figure 11A:
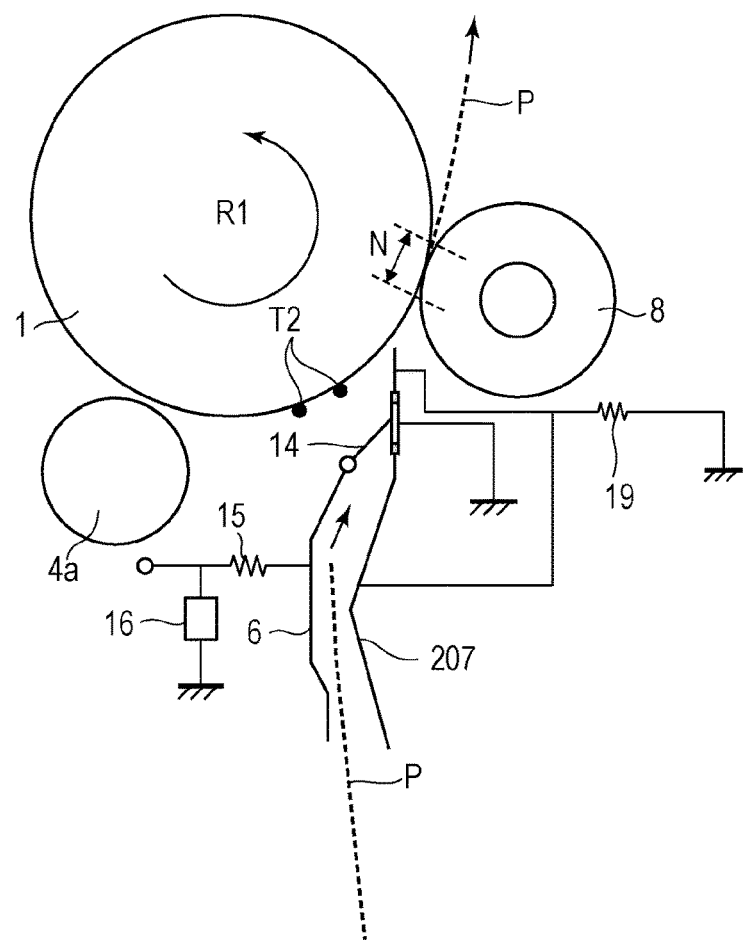
FIGS. 11A and 11B are cross-sectional views schematically illustrating a configuration near a transport portion according to a second exemplary embodiment.
Figure 11B:
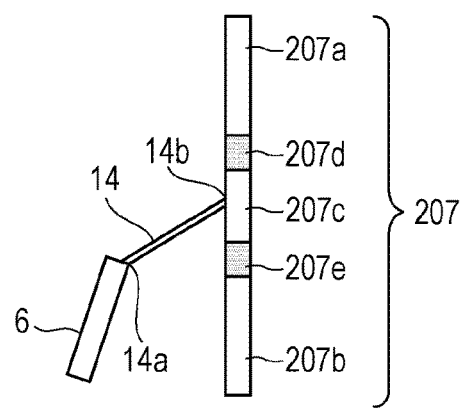

In the first exemplary embodiment, a configuration has been described in which the lower guide 7 is electrically connected to the electrical ground without any electrical resistance in between. Conversely, as illustrated in FIGS. 11A and 11B, a second exemplary embodiment is different from the first exemplary embodiment in that a lower guide 207 includes a conductive portion electrically connected to an electrical ground with a resistor 19 in between, and a conductive portion that is connected to an electrical ground without an electrical resistance in between. Note that the configuration of the present exemplary embodiment is similar to that of the first exemplary embodiment except for the point that a plurality of grounding paths of the lower guide 207 are provided; accordingly, portions common with the first exemplary embodiment will be attached with the same reference numerals and description thereof will be omitted.

Figure 12:
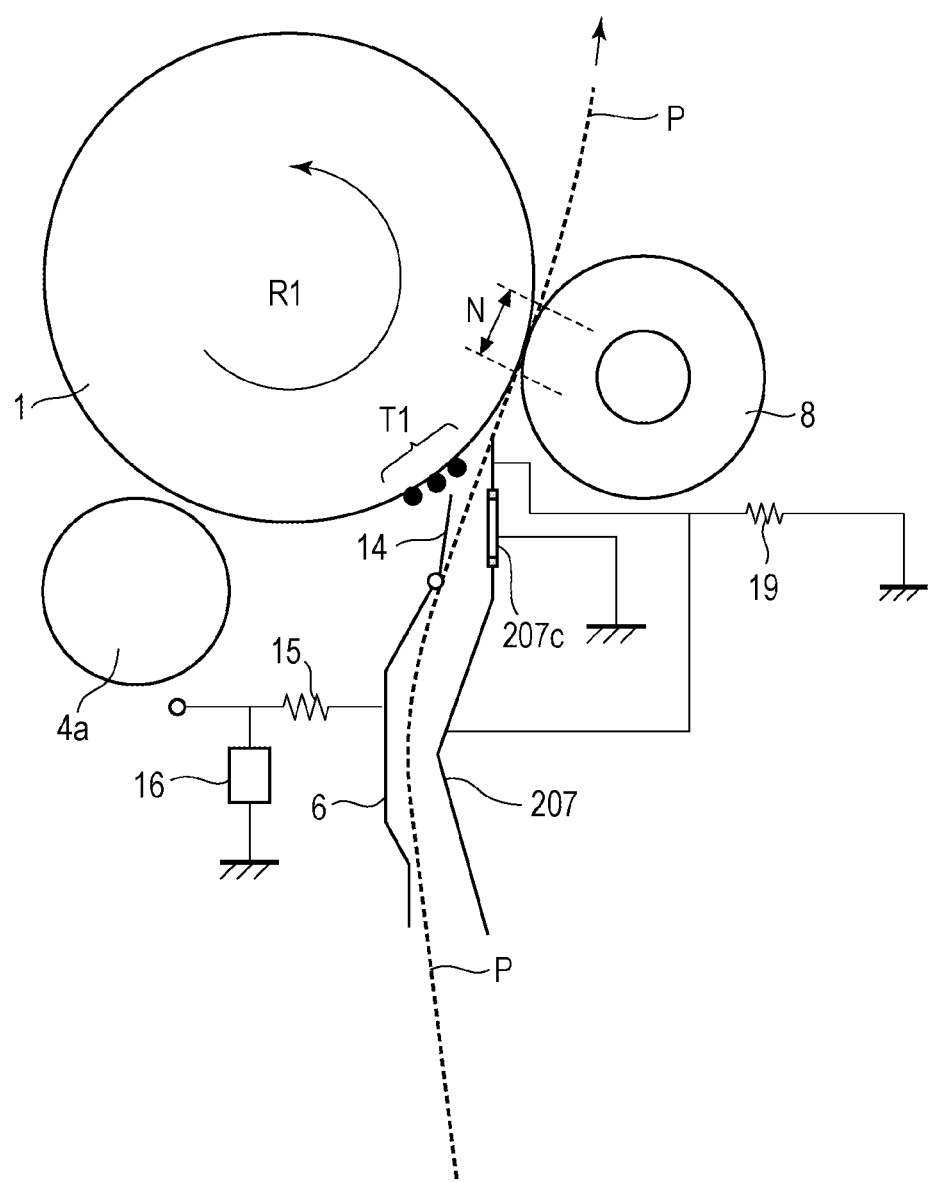
FIG. 12 is a diagram schematically illustrating the second state in which a moving member has been separated from a lower guide in the second exemplary embodiment.

FIG. 11A is a cross-sectional view schematically illustrating a configuration around the transfer portion N in the first state in which the moving member 14 is abutted against the lower guide 207, and FIG. 11B is a diagram schematically illustrating a configuration of the lower guide 207 according to the present exemplary embodiment. Furthermore, FIG. 12 is a cross-sectional view schematically illustrating a configuration around the transfer portion N in the second state in which the moving member 14 has been separated from the lower guide 207 by being pushed by the conveyed transfer material P. As illustrated in FIG. 11A, the lower guide 207 includes the conductive portion electrically connected to the electrical ground with the resistor 19 in between, and the conductive portion electrically connected to the electrical ground without an electrical resistance in between.

As illustrated in FIG. 11B, in the conveyance direction of the transfer material P, the lower guide 207 includes a conductive portion 207a (a second conductive portion) on the downstream side, and a conductive portion 207b on the upstream side. Furthermore, a conductive portion 207c (a first conductive portion) is provided on the upstream side of the conductive portion 207a, and at a position that is downstream of the conductive portion 207b and that is where the contact portion 14b of the moving member 14 abut against. The conductive portion 207c constituted by stainless steel (SUS) or the like is, in the conveyance direction of the transfer material P, interposed between an insulating portion 207d and an insulating portion 207e on the downstream side and on the upstream side, respectively, of the conductive portion 207c.

As illustrated in FIGS. 11A and 11B, the conductive portion 207a and the conductive portion 207b are electrically connected to the electrical ground with the resistor 19 in between, and the conductive portion 207c is electrically connected to the electrical ground without an electrical resistance in between. In other words, in the first state in which the contact portion 14b of the moving member 14 abuts against the lower guide 207, the upper guide 6 is electrically connected to the conductive portion 207c through the moving member 14 and is grounded.

On the other hand, as illustrated in FIG. 12, in the second state in which the contact portion 14b of the moving member 14 is separated from the lower guide 207 by being pushed by the conveyed transfer material P, the upper guide 6 is grounded with the resistor 19 in between. More specifically, the upper guide 6 is grounded with the moving member 14, the transfer material P, the conductive portion 207a or the conductive portion 207b against which the transfer material P abuts, and the resistor 19 in between. Note that in the present exemplary embodiment, the conductive portion 207c is disposed at a position where the transfer material P and the conductive portion 207c do not come in contact with each other when the toner image is transferred to the transfer material P from the photosensitive drum 1.

Figure 13A:
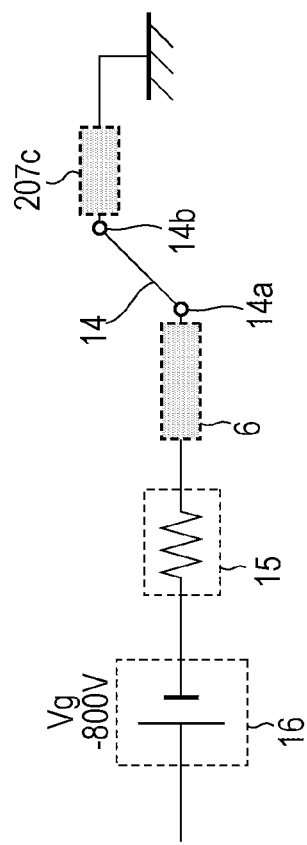
FIGS. 13A and 13B are diagrams schematically illustrating conductive paths of the moving member according to the second exemplary embodiment.

Hereinafter, a conduction path of the upper guide 6 in the present exemplary embodiment when the moving member 14 abuts against or is separated from the lower guide 207 will be described with reference to FIGS. 13A and 13B. FIG. 13A is a diagram schematically illustrating a conduction path in the first state in which the contact portion 14b of the moving member 14 is abutted against the conductive portion 207c. Furthermore, FIG. 13B is a diagram schematically illustrating a conduction path in the second state in which the contact portion 14b of the moving member 14 is separated from the conductive portion 207c.

When an image forming operation is stated, the power source 16 outputs the voltage Vg of −800 [V] towards the upper guide 6. As illustrated in FIG. 13A, in the first state, the upper guide 6 is electrically connected to the electrical ground with the moving member 14, which is abutted against the conductive portion 207c, in between. Accordingly, in the above state, the potential Vs of the upper guide 6 is almost 0 [V].

Figure 13B:
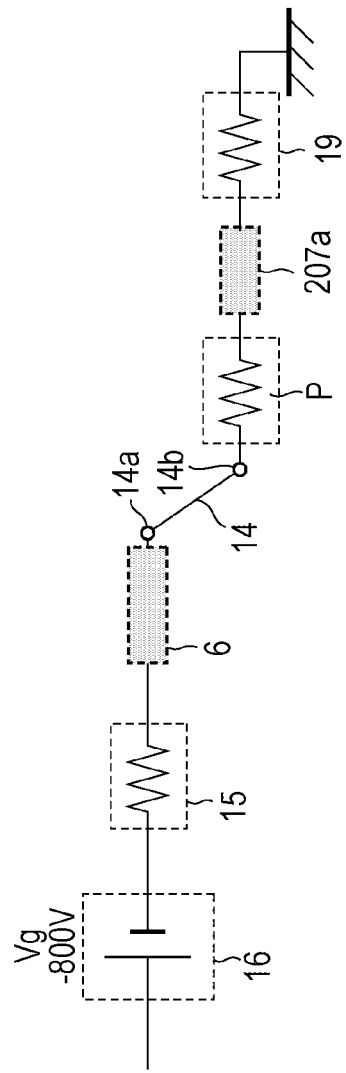

On the other hand, as illustrated in FIG. 13B, in the second state, the potential Vs of the upper guide 6 is determined from the voltage dividing resistance ratio between the resistor 15, the moving member 14, the transfer material P, and the resistor 19. In the present exemplary embodiment, a resistor of 2000 MΩ is used as the resistor 19. In the above configuration, since the resistance value of the resistor 19 is a sufficiently large value, regardless of the size of the electrical resistance of the transfer material P, the potential Vs of the upper guide 6 is a potential that is almost the same as the voltage Vg output from the power source 16.

The electrical resistance of the transfer material P changes according to the ambient environment. For example, in a high-temperature and high-humidity environment, the electrical resistance of the transfer material P becomes low by containing and absorbing the water content in the air. In such a case, there may be a leakage of the electric current through the transfer material P. However, in the configuration of the present exemplary embodiment, the conductive portion 207a and the conductive portion 207b that come in contact with the transfer material P are electrically connected to the electrical ground with the resistor 19 having a sufficiently large resistance value in between. In a case in which the electrical resistance of the transfer material P becomes low due to a high-temperature and high-humidity environment or the like, the above configuration suppresses the electric current from leaking to the electrical ground through the transfer material P and is capable of forming the desired potential Vs on the upper guide 6.

Table 2 illustrates, in a case in which high printing rate images are formed on a thousand sheets of continuously fed transfer materials P in various ambient environments, the potential values of the upper guide 6 of the present exemplary embodiment, and evaluation results of the taint on the upper guide 6 and evaluation results of image defects owing to the tainted upper guide 6. The ambient environments under which the evaluations were performed were a low-temperature and low-humidity environment in which the room temperature was 15° C. and the humidity was 10%, a normal-temperature and normal-humidity environment in which the room temperature was 25° C. and the humidity was 50%, and a high-temperature and high-humidity environment in which the room temperature was 32° C. and the humidity was 85%. Furthermore, letter-sized transfer materials P in which the electrical resistances of the transfer materials P in the thickness direction were, in the order of the environments described above, about 1000 MΩ, about 200 MΩ, and about 50 MΩ were used. The voltage Vg output from the power source 16 was set to −800 [V], and the criteria of the evaluation was similar to that of the first exemplary embodiment.

TABLE 2

| | Image forming environment | Electrical resistance [MΩ] of transfer material P | Potential [V] of upper guide 6 During transfer | Potential [V] of upper guide 6 Time between sheets | Evaluation |
|---|---|---|---|---|---|
| Present Exemplary Embodiment | Low-temperature/low-humidity environment (room temperature 15° C., humidity 10%) | 1000 | −800 | 0 | Excellent |
| | Normal-temperature/normal-humidity environment (room temperature 25° C., humidity 50%) | 200 | −800 | 0 | Excellent |
| | High-temperature/high-humidity environment (room temperature 32° C., humidity 85%) | 10 | −800 | 0 | Excellent |

As illustrated in Table 2, in the present exemplary embodiment, regardless of the ambient environment and the value of the electrical resistance of the transfer material P, the taint of the upper guide 6 was insignificant and no image defect occurred. The above is because, as described above, the resistance value of the resistor 19 was configured sufficiently larger than the value of the electrical resistance of the transfer material P.

As described above, the configuration of the present exemplary embodiment was capable of not only obtaining a similar effect to that of the first exemplary embodiment but was capable of suppressing the upper guide 6 from becoming tainted and the transfer material P from becoming tainted by the toner adhered to the upper guide 6 regardless of the value of the electrical resistance of the transfer material P.

Third Exemplary Embodiment

In the configuration of the first exemplary embodiment, the uniform potential is formed on the conductive moving member 14 supported by the upper guide 6 by applying the voltage Vg to the upper guide 6 from the power source 16. Conversely, in a third exemplary embodiment, as illustrated in FIG. 14, a leading edge portion of a moving member 314 supported by an upper guide 306 is divided in the longitudinal direction, and the voltage Vg is applied from the power source 16 to a contact of each divided moving member 314. Note that in the present exemplary embodiment as well, members that are common with those of the first exemplary embodiment are denoted with the same reference numerals and description thereof is omitted.

FIG. 14 is a schematic top view of the upper guide 306 and the moving member 314 according to the present exemplary embodiment viewed from a direction intersecting the conveyance direction of the transfer material P. Hereinafter, the transfer material P described in the present exemplary embodiment is an A5 size transfer material P. Furthermore, the upper guide 306 and the moving member 314 are formed of a conductive material, such as a stainless steel (SUS).

As illustrated in FIG. 14, the moving member 314 is divided in a plurality of pieces in the longitudinal direction of the upper guide 306 with an insulating member 31 in between, and includes a contact portion 314a, a contact portion 314b, and a contact portion 314c that are capable of being in contact with the conveyed transfer material P. The contact portion 314b is disposed inside the A5 width, and the contact portion 314a and the contact portion 314c are disposed outside the A5 width. The contact portion 314a, the contact portion 314b, and the contact portion 314c are each capable of being independently separated from the lower guide 7 by being pushed by the conveyed transfer material P, and include a contact point a1, a contact point b1, and a contact point c1, respectively, with the power source 16.

FIG. 15A is a diagram schematically illustrating a state of the contact portion 314b of the moving member 314 when an A5 size transfer material P is nipped at the transfer portion N. Furthermore, FIG. 15B is a diagram schematically illustrating a state of the contact portions 314a and 314c of the moving member 314 when an A5 size transfer material P is nipped at the transfer portion N. As illustrated in FIG. 15A, the power source 16 of the present exemplary embodiment applies a voltage to each contact point provided in the moving member 314 to indirectly apply voltage to the upper guide 306.

In a case in which formation of an image is performed on the A5 size transfer material P, as illustrated in FIG. 14 as well, due to the relationship between a longitudinal width of the transfer material P and a longitudinal width of the moving member 314, the transfer material P, after pushing the contact portion 314b and being conveyed, is nipped at the transfer portion N. In the above, the contact portion 314a pushed by the transfer material P is, as illustrated in FIG. 15A, separated from the lower guide 7 and reaches the second state, and in the second state, forms a conduction path with the power source 16 through the contact point b1 of the contact portion 314b. On the other hand, as illustrated in FIG. 15B, the contact portion 314a and the contact portion 314c that are not pushed by the transfer material P maintain the first state in which the contact portion 314a and the contact portion 314c abut against the lower guide 7.

The polarity inverted toner T2 easily adheres to the so-called non-sheet passing area of the photosensitive drum 1 where the toner image transferred to the transfer material P is not carried. The above occurs because, in the non-sheet passing area where the toner image is not carried, the relationship between the potential of the photosensitive drum 1 and the potential of the developing roller 4a becomes close to the relationship of the potentials formed at the time between sheets described in the first exemplary embodiment. Described in more detail, a latent image electric potential is formed in a sheet passing area of the photosensitive drum 1 with the charge roller 2 uniformly charging the area abutted against the photosensitive drum 1 and forming a background potential, and with the exposure unit 3 performing exposure according to image information. In the above, due to the potential difference between the potential formed in the non-sheet passing area of the photosensitive drum 1 and the potential of the developing roller 4a, the polarity inverted toner T2 easily adheres to the non-sheet passing area of the photosensitive drum 1 from the developing unit 4.

As illustrated in FIGS. 15A and 15B, in the configuration of the present exemplary embodiment, the states of the contact portions 314a to 314c of the moving member 314 in the sheet passing area where the transfer material P passes or the non-sheet passing area where the transfer material P does not pass are different. The contact portion 314b that is disposed at a position that corresponds to the sheet passing area is pushed by the transfer material P and reaches the second state in which the contact portion 314b is separated from the lower guide 7, and the contact portion 314a and the contact portion 314c that are disposed at positions corresponding to the non-sheet passing area reach the first state in which the contact portion 314a and the contact portion 314c abut against the lower guide 7.

Figure 16:
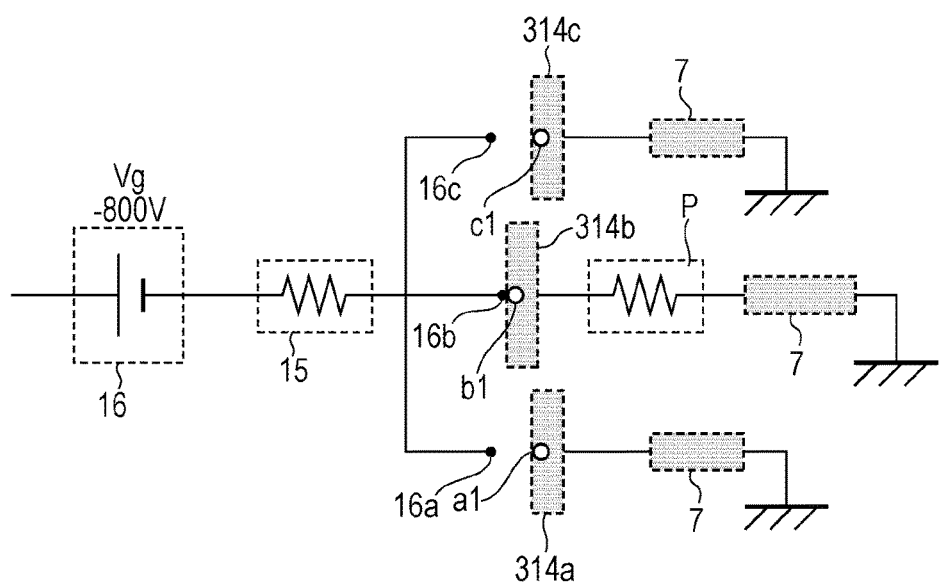
FIG. 16 is a diagram schematically illustrating conductive paths of the moving members according to the third exemplary embodiment.

Referring next to FIG. 16, the potential formed in each of the contact portions 314a to 314c will be described. FIG. 16 is a diagram schematically illustrating the conduction paths from the power source 16 to the electrical ground with the contact portions 314a to 314c in between. As illustrated in FIG. 16, a contact 16a, a contact 16b, and a contact 16c that are capable of abutting against the contact point a1 of the contact portion 314a, the contact point b1 of the contact portion 314b, and the contact point c1 of the contact portion 314c, respectively, are provided between the power source 16 and the moving member 314 of the present exemplary embodiment. Furthermore, the power source 16 outputs the voltage Vg of −800 [V] at a predetermined timing during the image forming operation.

When the image forming operation is started and the contact portion 314b separated from the lower guide 7 by being pushed by the transfer material P reaches the second state, the contact point b1 of the contact portion 314b and the contact 16b abut against each other; accordingly, a conduction path illustrated in FIG. 16 is formed. In the above, under a normal-temperature and normal-humidity environment in which the room temperature is 25° C. and the humidity is 50%, when the electrical resistance of the transfer material P is 200 MΩ, the potential of the contact portion 314b is about −400 [V] from the relationship of the voltage dividing resistance ratio of each of the members in the conduction path. The above potential can suppress the toner that has a negative polarity and that is carried by the photosensitive drum 1 from adhering to the contact portion 314b.

Meanwhile, the contact portion 314a and the contact portion 314b that are not pushed by the transfer material P each maintain the state connected to the electrical ground with the lower guide 7 in between since the contact point a1 and the contact point c1 do not abut against the contact 16a and the contact 16c connected to the power source 16. Accordingly, the potentials of the contact portion 314a and the contact portion 314c are almost 0 [V]. With the above, the toner that has a positive polarity and that is adhered to the non-sheet passing area of the photosensitive drum 1 can be suppressed from adhering to the contact portion 314a and the contact portion 314c.

As described above, in the configuration of the present exemplary embodiment, a potential having a negative polarity is formed in the contact portion 314b disposed in the sheet passing area where a small-sized transfer material P passes; accordingly, the toner that has a negative polarity and that is carried by the photosensitive drum 1 can be suppressed from electrostatically adhering to the moving member 314. At the same time, the potentials of the contact portions 314a and 314c, which are disposed in the non-sheet transfer area where the small-sized transfer material P does not pass, are maintained at almost 0 [V]; accordingly, the polarity inverted toner that easily adheres to the non-sheet passing area can be suppressed from electrostatically adhering to the moving member 314. In other words, the present exemplary embodiment is capable of not only obtaining an effect that is similar to that of the first exemplary embodiment but is also capable of suppressing toner having a positive polarity and a negative polarity from adhering to the moving member 314 provided near the photosensitive drum 1 when forming an image on a small-sized sheet.

Note that in the present exemplary embodiment, in the longitudinal direction of the upper guide 306, the moving member 314 is divided in three; however, the number in which the moving member 314 is divided and the dividing width are not limited to the configuration of the present exemplary embodiment. The lower guide 207 of the second exemplary embodiment may be used as the lower guide 7 included in the present exemplary embodiment.

Fourth Exemplary Embodiment

In the first exemplary embodiment, a configuration has been described in which the supported portion 14a of the moving member 14 is supported by either one of the upper guide 6 and the lower guide 7, and the contact portion 14b is abutted against or separated from the other one. Conversely, a fourth exemplary embodiment includes a configuration in which moving members 414 that are moved by being pushed by the transfer material P are provided in a registering guide 402 provided, in the conveyance direction of the transfer material P, upstream of the lower guide 7 and downstream of the conveyance rollers 5. Note that in the present exemplary embodiment as well, members that are common with those of the first exemplary embodiment are denoted with the same reference numerals and description thereof is omitted.

Figure 17:
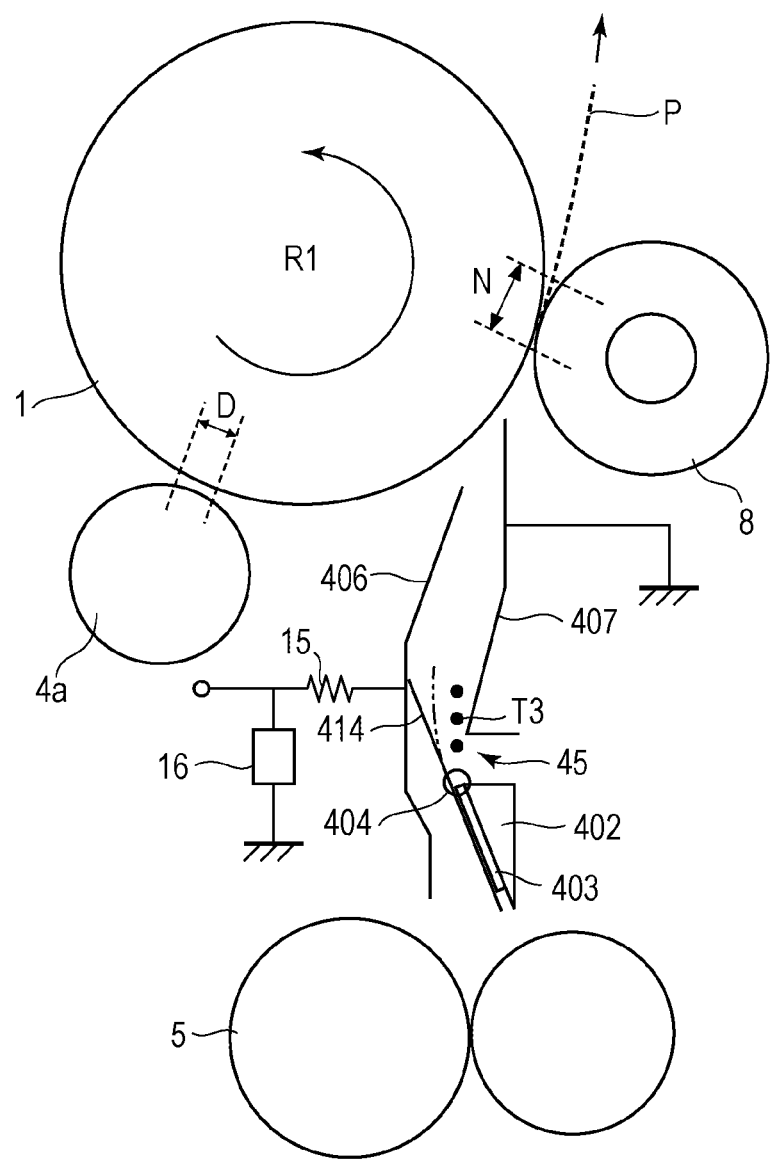
FIG. 17 is a diagram schematically illustrating a configuration near a transport portion according to a fourth exemplary embodiment.

FIG. 17 is a diagram schematically illustrating a configuration of the moving members 414 according to the present exemplary embodiment. As illustrated in FIG. 17, the moving members 414 are adhered to the registering guide 402 by an insulating adhesion member 403 in between. Furthermore, the moving members 414 are capable of being switched between the first state (depicted by a solid line in the drawing) in which the moving members 414 are abutted against the upper guide 406, and the second state (depicted by a broken line in the drawing) in which the moving members 414 are separated from the upper guide 406 by being pushed by the conveyed transfer material P.

In the present exemplary embodiment, a thickness of each moving members 414 is about a few hundred micrometers so as not to interrupt the conveyance of the transfer material P. Furthermore, in order to suppress scraping caused by rubbing and triboelectric charging with the transfer material P, desirably, a conductive member formed of a stainless steel (SUS) or an ultrahigh polymer material, or an antistatic member is used on at least the surface that comes in contact with the transfer material P.

The registering guide 402 is a mold member provided upstream of the conveying roller 5 serving as a conveying member that, while correcting the skew of the transfer material P, conveys the transfer material P towards the transfer portion N, and is a member separate from a lower guide 407. Toner T3 is toner that falls from the photosensitive drum 1 and members around the photosensitive drum 1.

In the configuration of the image forming apparatus 100 illustrated in FIG. 1, the transfer material P fed form the sheet feeding cassette 20 is conveyed in the vertical direction and, after the toner image is transferred thereto from the photosensitive drum 1 at the transfer portion N, is discharged towards the sheet discharge tray 22 through the discharge roller 21. In the above case in which the transfer material P is conveyed in the vertical direction, there is a concern that the toner adhered to the upper guide 406 may fall in the vertical direction and adhere to the conveyance rollers 5. The conveyance rollers 5 are conveying members that convey the transfer material P to the transfer portion N while correcting the skew of the transfer material P. There is a concern that the adhered toner may taint the conveyed transfer material P when toner adheres to the conveyance rollers 5.

As illustrated in FIG. 17, the moving members 414 are disposed between the registering guide 402 and the upper guide 406 so as to receive the toner T3 falling towards the conveyance rollers 5. Accordingly, the configuration of the present exemplary embodiment is capable of suppressing adhesion of toner to the conveyance rollers 5, and suppressing the transfer material P from being tainted by toner. Furthermore, in the configuration of the present exemplary embodiment, since the moving members 414 capable of receiving the falling toner T3 are switched from the first state to the second state by being pushed by the transfer material P, adhesion of toner to the conveyance rollers 5 can be suppressed without interfering with the conveyance of the transfer material P.

Note that as long as the moving members 414 are disposed at a position at least above the conveyance rollers 5, the conveyance rollers 5 can be prevented from being tainted by the falling toner T3. In the present exemplary embodiment, in the longitudinal direction of the upper guide 406 and the lower guide 407, a plurality of moving members 414 each having a length that is substantially the same as the conveyance rollers 5 or that is longer than the conveyance rollers 5 in the longitudinal width are disposed above the conveyance rollers 5 provided in a plural number. However, not limited to the above, a single moving member 414 having a length corresponding to a length of the conveyance roller 5 from end to end in the longitudinal direction of the upper guide 406 and the lower guide 407 may be supported by the registering guide 402. Moreover, a hole for releasing the dropping toner T3 may be provided in the lower guide 407 so that the falling toner T3 does not affect the operation of the moving members 414.

Furthermore, in the present exemplary embodiment, the moving members 414 are disposed in the registering guide 402 provided upstream of the lower guide 407 in the conveyance direction of the transfer material P; however, not limited to the above, for example, the registering guide 402 may be disposed upstream of the upper guide 406 in the conveyance direction of the transfer material P. In such a case, the moving members 414 are supported by the registering guide 402, and are capable of abutting against or separating from the lower guide 407 with the conveyance of the transfer material P.

Fifth Exemplary Embodiment

Figure 18A:
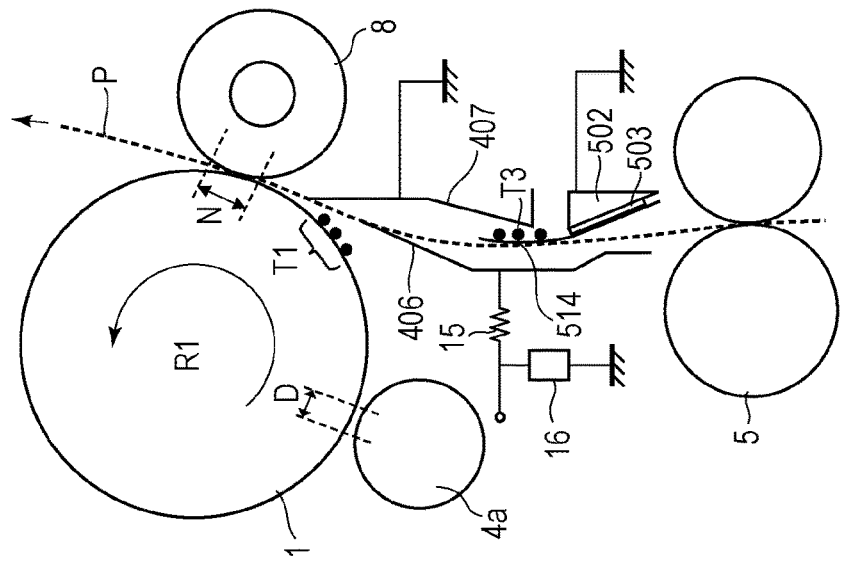
FIGS. 18A and 18B are diagrams schematically illustrating a configuration near a transport portion according to a fifth exemplary embodiment.
Figure 18B:
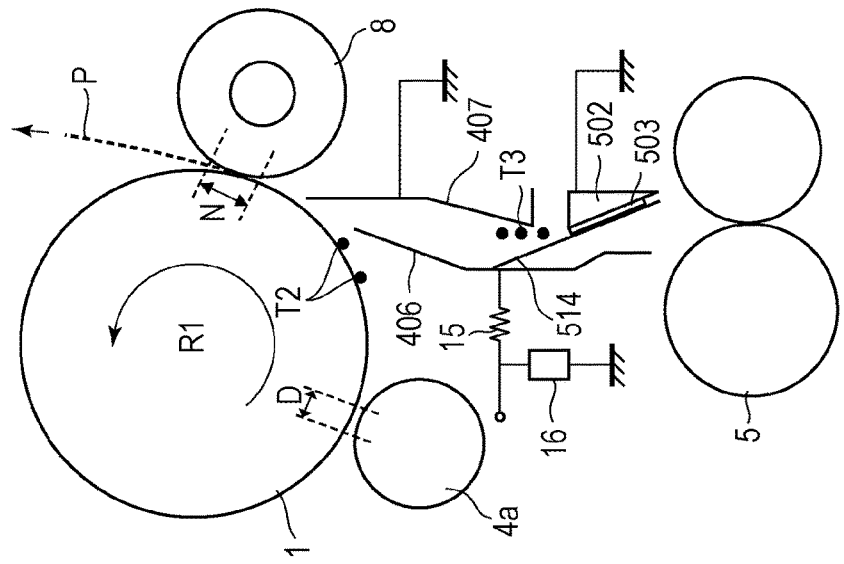

In the fourth exemplary embodiment, a configuration in which the moving members 414 are supported by the registering guide 402 with an insulating adhesion member has been described. Conversely, in a fifth exemplary embodiment, as illustrated in FIGS. 18A and 18B, a description will be given of a moving member 514 supported by a registering guide 502, which is electrically connected to an electrical ground, with a conductive adhesion member. Note that the configuration of the present exemplary embodiment is the same as that of the fourth exemplary embodiment other than that the registering guide 502 is electrically connected to an electrical ground and that a conduction path is formed between the upper guide 406 and the registering guide 502; accordingly, portions that are common with the fourth exemplary embodiment are denoted with the same reference numerals and description thereof is omitted.

FIG. 18A is a diagram schematically illustrating a configuration around the transfer portion N in the first state in which the moving member 514 is abutted against the upper guide 406. Furthermore, FIG. 18B is a diagram schematically illustrating the second state in which the moving member 514 is separated from the upper guide 406 by being pushed by the conveyed transfer material P. In the present exemplary embodiment, the moving member 514, the registering guide 502, and an adhesion member 503 are all formed of a conductive material, and the registering guide 502 is electrically connected to an electrical ground.

As illustrated in FIG. 18A, when the transfer material P is not pushing the moving member 514, the moving member 514 abuts against the upper guide 406, and the upper guide 406 is electrically connected to an electrical ground through the moving member 514, the adhesion member 503, and the registering guide 502. In other words, when the voltage Vg is output form the power source 16 while in the first state in which the moving member 514 abuts against the upper guide 406, the potential formed in the upper guide 406 is almost 0 [V]. With the above, at the time between sheets, the polarity inverted toner adhered to the photosensitive drum 1 can be prevented from adhering to the upper guide 406.

Furthermore, as illustrated in FIG. 18B, in the second state in which the moving member 514 is pushed by the conveyed transfer material P and the moving member 514 is separated from the upper guide 406, the potential formed in the upper guide 406 is determined by the voltage dividing resistance ratio of each member. For example, in a case in which the voltage Vg of −800 [V] is output from the power source 16, the electrical resistance of the resistor 15 is 200 MΩ, and the electrical resistance of the transfer material P under a normal-temperature and normal-humidity environment is 200 MΩ, the potential formed in the upper guide 406 is about −400 [V]. With the above, when the toner image is transferred to the transfer material P from the photosensitive drum 1 at the transfer portion N, the toner that has a negative polarity and that is carried by the photosensitive drum 1 can be prevented from adhering to the upper guide 406.

As described above, the configuration of the present exemplary embodiment is not only capable of preventing the falling toner T3 from adhering to the conveyance roller 5 but toner having a positive polarity and a negative polarity can be prevented from adhering to the upper guide 406 provided near the photosensitive drum 1. With the above, the transfer material P can be prevented from becoming tainted by adhesion of the toner to the conveyed transfer material P.

Note that in the present exemplary embodiment, the lower guide 407 and the registering guide 502 are configured as different members; however, not limited to the above, the same effect can be obtained in a configuration in which the lower guide 407 and the registering guide 502 are configured as the same member.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-029505 filed Feb. 20, 2017, which is hereby incorporated by reference herein in its entirety.

What is claimed is:

1. An image forming apparatus comprising:
   an image bearing member configured to carry a toner image;
   a transfer member configured to transfer, to a transfer material from the image bearing member, the toner image carried on the image bearing member;
   a fixing unit configured to fix the toner image to the transfer material;
   a power source configured to apply a voltage to the fixing unit in a fixing operation;
   a first guiding member configured to guide the transfer material that is being conveyed to a contact position where the image bearing member and the transfer member are in contact with each other, wherein the contact position is disposed, in a conveyance direction of the transfer material, upstream with respect to a transfer position where the toner image is transferred to the transfer material from the image bearing member, and wherein a voltage equivalent to a normal charge polarity of toner is applied from the power source to the first guiding member at least during a transfer of the toner image to the transfer material from the image bearing member;
   a second guiding member that is disposed to oppose the first guiding member and configured to guide the transfer material that is being conveyed, wherein the second guiding member is electrically connected to an electrical ground; and
   a moving member that is conductive and capable of moving between a first state, in which the moving member is supported by either one of the first guiding member or the second guiding member and in which the moving member abuts against the other of the first guiding member or the second guiding member not supporting the moving member, and a second state, in which the moving member is separated from the other of the first guiding member or the second guiding member not supporting the moving member by being pushed by the transfer material conveyed in the first state.

2. The image forming apparatus according to claim 1, wherein the moving member transitions to the first state from the second state when a trailing edge of the transfer material pushing the moving member passes the moving member.

3. The image forming apparatus according to claim 1, further comprising: a developing unit that includes a developing member configured to carry the toner,
   wherein the developing unit is capable of developing the toner image on the image bearing member with the toner carried by the developing member, and
   wherein the first guiding member is disposed at a position nearer to the developing member than the second guiding member in a direction that intersects the conveyance direction of the transfer material.

4. The image forming apparatus according to claim 1, wherein the first guiding member is disposed to oppose a surface of the transfer material, to which the toner image is transferred from the image bearing member, that comes in contact with the image bearing member, and the second guiding member is disposed to oppose a surface of transfer material, to which the toner image is transferred from the image bearing member, that comes in contact with the transfer member.

5. The image forming apparatus according to claim 1,
wherein the moving member is supported by the first guiding member and is capable of abutting against and separating from the second guiding member, and
wherein the second guiding member includes:
a first conductive portion at a position that comes in contact with the moving member, wherein the first conductive portion is electrically connected to an electrical ground while being interposed between an insulating portion on an upstream side and an insulating portion on a downstream side in the conveyance direction of the transfer material, and
a second conductive portion at a position that comes in contact with the transfer material that is being conveyed, wherein the second conductive portion is electrically connected to an electrical ground with a resistor interposed in between.

6. The image forming apparatus according to claim 1,
wherein the moving member includes, in a longitudinal direction of the first guiding member and the second guiding member, a plurality of contact portions that are capable of abutting against or separating from either one of the first guiding member or the second guiding member not supporting the moving member, and
wherein the plurality of contact portions is capable of independently transitioning to the first state or the second state.

7. The image forming apparatus according to claim 1,
wherein the plurality of contact portions includes contact points that come in contact with the power source, the power source includes contacts, each configured to apply a voltage to the corresponding one of the contact points, and
wherein, in the first state, the contact points do not abut against the contacts and, in the second state, the contact points abut against the contacts.

8. The image forming apparatus according to claim 1,
wherein the power source is configured to apply a voltage with a fixed value to the first guiding member while the toner image is transferred to the transfer material from the image bearing member.

9. The image forming apparatus according to claim 1,
wherein, in the first state, the first guiding member is electrically conducted to the second guiding member through the moving member, and
wherein, in the second state, the first guiding member is electrically conducted to the second guiding member through the moving member and the transfer material that pushes the moving member.

10. The image forming apparatus according to claim 1, wherein the moving member is a conductive sheet-shaped member.

11. The image forming apparatus according to claim 1, further comprising: a developing unit configured to develop the toner image on the image bearing member and including a developing member disposed at a position opposing the image bearing member,
wherein the developing member is capable of carrying toner stored in the developing unit, and
wherein a void is formed between the developing member and the image bearing member, and the toner image is developed on the image bearing member by having the toner carried by the developing member move to the image bearing member at the void.

* * * * *